(12) United States Patent
Tsukamoto et al.

(10) Patent No.: US 10,106,436 B2
(45) Date of Patent: Oct. 23, 2018

(54) SELECTIVE ADSORBENT FABRIC FOR WATER PURIFICATION

(71) Applicant: Chemica Technologies, Inc., Portland, OR (US)

(72) Inventors: Takuji Tsukamoto, Beaverton, OR (US); Jason Trevor Gatlin, Eugene, OR (US)

(73) Assignee: Chemica Technologies, Inc., Portland, OR (US)

( * ) Notice: Subject to any disclaimer, the term of this patent is extended or adjusted under 35 U.S.C. 154(b) by 0 days.

(21) Appl. No.: 15/669,577

(22) Filed: Aug. 4, 2017

(65) Prior Publication Data

US 2017/0334741 A1    Nov. 23, 2017

Related U.S. Application Data

(63) Continuation of application No. 14/214,196, filed on Mar. 14, 2014, now abandoned.

(Continued)

(51) Int. Cl.
| | |
|---|---|
| *B01D 15/00* | (2006.01) |
| *C02F 1/42* | (2006.01) |
| *B01D 35/00* | (2006.01) |
| *B01J 39/00* | (2006.01) |
| *C02F 1/28* | (2006.01) |
| *B01J 20/28* | (2006.01) |
| *B01J 20/32* | (2006.01) |

(Continued)

(52) U.S. Cl.
CPC .............. *C02F 1/283* (2013.01); *B01J 20/20* (2013.01); *B01J 20/2804* (2013.01); *B01J 20/28038* (2013.01); *B01J 20/3248* (2013.01); *C02F 1/288* (2013.01); *C02F 3/342* (2013.01); *C02F 2001/422* (2013.01); *C02F 2101/103* (2013.01); *C02F 2101/20* (2013.01); *C02F 2103/06* (2013.01)

(58) Field of Classification Search
CPC .............. B01D 2253/202; B01J 20/20; B01J 20/28023; B01J 20/28038; B01J 20/2804; B01J 20/3248; B01J 39/00; B01J 47/12
See application file for complete search history.

(56) References Cited

U.S. PATENT DOCUMENTS

| | | | |
|---|---|---|---|
| 3,194,629 | A | 7/1965 | Dreibelbis et al. |
| 3,542,669 | A | 11/1970 | DeFeo |

(Continued)

FOREIGN PATENT DOCUMENTS

| | | |
|---|---|---|
| CN | 102875830 | 1/2014 |
| CN | 103551121 | 8/2016 |

(Continued)

OTHER PUBLICATIONS

Ansari et al., "Application of Activated Carbon for Removal of Arsenic Ions from Aqueous Solutions," *E-Journal of Chemistry* 4:103-108, 2007.

(Continued)

*Primary Examiner* — Ana M Fortuna
(74) *Attorney, Agent, or Firm* — Klarquist Sparkman, LLP

(57) ABSTRACT

A water purification chamber is provided. In one embodiment, a system comprises a purification chamber comprising a selective adsorbent activated carbon fiber fabric including one or more selective functional groups that bind arsenic.

22 Claims, 14 Drawing Sheets

Related U.S. Application Data

(60) Provisional application No. 61/802,514, filed on Mar. 16, 2013.

(51) Int. Cl.
| | |
|---|---|
| *B01J 20/20* | (2006.01) |
| *C02F 103/06* | (2006.01) |
| *C02F 101/20* | (2006.01) |
| *C02F 3/34* | (2006.01) |
| *C02F 101/10* | (2006.01) |

(56) References Cited

U.S. PATENT DOCUMENTS

| | | |
|---|---|---|
| 4,305,827 A | 12/1981 | Sasaki |
| 4,518,490 A | 5/1985 | Fish |
| 4,839,029 A | 6/1989 | Ichikawa et al. |
| 4,877,920 A | 10/1989 | Lush et al. |
| 5,085,844 A | 2/1992 | Nowack et al. |
| 5,231,063 A | 7/1993 | Fukumoto et al. |
| 5,407,576 A | 4/1995 | Wolf et al. |
| 5,531,886 A | 7/1996 | Cameron et al. |
| 5,695,642 A | 12/1997 | Greenleigh et al. |
| 5,770,090 A | 6/1998 | Lewis, III |
| 6,129,846 A | 10/2000 | Gadkaree |
| 6,589,904 B1 | 7/2003 | Iwasaki et al. |
| 6,599,428 B1 | 7/2003 | Douglas |
| 6,818,135 B2 | 11/2004 | Morton |
| 6,843,922 B1 | 1/2005 | Summers, Jr. et al. |
| 6,843,923 B2 | 1/2005 | Morton |
| 6,849,187 B2 | 2/2005 | Shaniuk |
| 6,994,792 B2 | 2/2006 | Schlegel |
| 7,109,366 B2 | 9/2006 | Morton |
| 7,163,634 B2 | 1/2007 | Morton |
| 7,229,550 B2 | 6/2007 | Haase |
| 7,294,268 B2 | 11/2007 | Yamasaki et al. |
| 7,341,667 B2 | 3/2008 | Kennard et al. |
| 7,361,279 B2 | 4/2008 | Hernandez et al. |
| 7,378,372 B2 | 5/2008 | Sylvester |
| 7,393,810 B2 | 7/2008 | Coronado et al. |
| 7,404,901 B2 | 7/2008 | Pinnavaia et al. |
| 7,419,601 B2 | 9/2008 | Cooper et al. |
| 7,419,604 B1 | 9/2008 | Atwood |
| 7,442,310 B2 | 10/2008 | Bortun et al. |
| 7,476,311 B2 | 1/2009 | Litz et al. |
| 7,479,230 B2 | 1/2009 | Kennard et al. |
| 7,510,992 B2 | 3/2009 | Wang et al. |
| 7,514,004 B1 | 4/2009 | Brady et al. |
| 7,572,380 B2 | 8/2009 | Cannon et al. |
| 7,662,291 B2 | 2/2010 | Krogue et al. |
| 7,718,071 B2 | 5/2010 | Krogue et al. |
| 7,767,001 B2 | 8/2010 | Schlegel et al. |
| 7,803,737 B2 | 9/2010 | Coronado et al. |
| 7,811,360 B2 | 10/2010 | Schlegel et al. |
| 7,828,969 B2 | 11/2010 | Eaton et al. |
| 7,871,524 B2 | 1/2011 | Wang et al. |
| 7,897,052 B2 | 3/2011 | Reddy |
| 7,910,005 B2 | 3/2011 | Wang et al. |
| 7,998,898 B2 | 8/2011 | Gadkaree et al. |
| 8,025,160 B2 | 9/2011 | Wang et al. |
| 8,039,658 B2 | 10/2011 | Mayorga et al. |
| 8,142,664 B2 | 3/2012 | Krogue et al. |
| 8,252,185 B2 | 8/2012 | Rajan et al. |
| 8,323,505 B2 | 12/2012 | Bauder et al. |
| 8,382,990 B2 | 2/2013 | Wang et al. |
| 8,636,971 B2 | 1/2014 | Mohanty et al. |
| 8,658,563 B2 | 2/2014 | Schremmer et al. |
| 8,673,152 B2 | 3/2014 | Smith et al. |
| 8,735,740 B2 | 5/2014 | Wang et al. |
| 8,741,243 B2 | 6/2014 | Gadkaree et al. |
| 8,747,675 B2 | 6/2014 | Cousins et al. |
| 8,747,676 B2 | 6/2014 | Hughes et al. |
| 8,771,519 B2 | 7/2014 | Kuhel et al. |
| 8,795,622 B2 | 8/2014 | Mohanty |
| 8,815,097 B2 | 8/2014 | Cousins et al. |
| 8,883,216 B2 | 11/2014 | Pronovost et al. |
| 9,102,551 B2 | 8/2015 | Beswick et al. |
| 9,206,052 B2 | 12/2015 | Fitzgerald et al. |
| 9,387,458 B2 | 7/2016 | Pan et al. |
| 9,550,148 B2 | 1/2017 | Clampitt et al. |
| 2002/0063052 A1 | 5/2002 | Peters et al. |
| 2002/0195407 A1 | 12/2002 | Levy |
| 2002/0198097 A1 | 12/2002 | El-Shoubary et al. |
| 2003/0029801 A1 | 2/2003 | Morton |
| 2003/0168401 A1 | 9/2003 | Koslow |
| 2004/0050795 A1 | 3/2004 | Park et al. |
| 2004/0089608 A1 | 5/2004 | Vo |
| 2004/0178149 A1 | 9/2004 | Hernandez et al. |
| 2005/0061748 A1 | 3/2005 | Morton |
| 2005/0260739 A1 | 11/2005 | Rosen et al. |
| 2005/0263456 A1 | 12/2005 | Cooper |
| 2006/0144793 A1 | 7/2006 | Dadachov |
| 2006/0180550 A1 | 8/2006 | Moore, III |
| 2006/0186054 A1 | 8/2006 | Webb et al. |
| 2006/0229200 A1 | 10/2006 | Yao et al. |
| 2006/0273015 A1 | 12/2006 | Pinnavaia et al. |
| 2006/0276327 A1 | 12/2006 | Morton et al. |
| 2007/0017871 A1 | 1/2007 | Reddy et al. |
| 2007/0199890 A1 | 8/2007 | Trogolo |
| 2008/0019781 A1 | 1/2008 | Mayerle |
| 2008/0047902 A1 | 2/2008 | Beswick et al. |
| 2008/0053922 A1 | 3/2008 | Honsinger, Jr. et al. |
| 2008/0110820 A1* | 5/2008 | Knipmeyer ............ C02F 1/003 210/474 |
| 2008/0119357 A1 | 5/2008 | Coronado et al. |
| 2008/0135489 A1 | 6/2008 | Saaski |
| 2008/0302731 A1 | 12/2008 | Wang et al. |
| 2009/0020477 A1 | 1/2009 | Dhekane et al. |
| 2009/0039028 A1 | 2/2009 | Eaton et al. |
| 2009/0118120 A1 | 5/2009 | Coronado et al. |
| 2009/0184054 A1 | 7/2009 | Crawford et al. |
| 2009/0252663 A1 | 10/2009 | Wetherill |
| 2010/0050869 A1 | 3/2010 | Gadkaree et al. |
| 2010/0059428 A1 | 3/2010 | Boren et al. |
| 2010/0098877 A1 | 4/2010 | Cooper et al. |
| 2010/0147770 A1 | 6/2010 | Fryxell et al. |
| 2010/0176053 A1 | 7/2010 | Adams et al. |
| 2010/0199841 A1 | 8/2010 | Gadkaree et al. |
| 2010/0307968 A1 | 12/2010 | Brigano et al. |
| 2010/0307980 A1 | 12/2010 | Tranter et al. |
| 2011/0020202 A1 | 1/2011 | Gadkaree et al. |
| 2011/0114573 A1 | 5/2011 | Simpson et al. |
| 2011/0132843 A1 | 6/2011 | Fan |
| 2011/0136663 A1 | 6/2011 | Schremmer et al. |
| 2011/0158872 A1 | 6/2011 | Ariya |
| 2011/0220576 A1 | 9/2011 | Cousins et al. |
| 2011/0220577 A1 | 9/2011 | Singh et al. |
| 2011/0220578 A1 | 9/2011 | Cousins et al. |
| 2011/0303589 A1 | 12/2011 | Kuennen et al. |
| 2011/0315013 A1 | 12/2011 | Wang et al. |
| 2012/0012532 A1 | 1/2012 | Fukushi et al. |
| 2012/0055862 A1 | 3/2012 | Parekh et al. |
| 2012/0080383 A1 | 4/2012 | Kesler et al. |
| 2012/0125203 A1 | 5/2012 | Fitzgerald et al. |
| 2012/0138530 A1 | 6/2012 | Burba, III et al. |
| 2012/0308461 A1 | 12/2012 | Mohanty et al. |
| 2012/0318742 A1 | 12/2012 | Beswick et al. |
| 2013/0040290 A1 | 2/2013 | Halden |
| 2013/0161261 A1 | 6/2013 | Widirstky et al. |
| 2013/0214442 A1* | 8/2013 | Naskar ................ D04H 1/4242 264/29.2 |
| 2013/0228522 A1 | 9/2013 | Calo et al. |
| 2013/0240453 A1 | 9/2013 | Kuhel et al. |
| 2013/0280601 A1 | 10/2013 | Geramita et al. |
| 2014/0116949 A1 | 5/2014 | P et al. |
| 2014/0175015 A1 | 6/2014 | Nishimi |
| 2014/0190883 A1 | 7/2014 | Handa |
| 2014/0291246 A1 | 10/2014 | Tsukamoto et al. |
| 2014/0356261 A1 | 12/2014 | Choi et al. |
| 2014/0374327 A1 | 12/2014 | Langdo et al. |
| 2015/0060365 A1 | 3/2015 | Widirstky et al. |
| 2015/0166382 A1 | 6/2015 | Fitzgerald et al. |
| 2015/0233021 A1* | 8/2015 | Naskar ................ D01F 6/04 428/401 |

(56) References Cited

U.S. PATENT DOCUMENTS

| | | |
|---|---|---|
| 2015/0251927 A1 | 9/2015 | Psaras et al. |
| 2015/0328620 A1 | 11/2015 | Wood et al. |
| 2016/0002067 A1 | 1/2016 | Spilling et al. |
| 2016/0023144 A1 | 1/2016 | Fitzgerald et al. |
| 2016/0038871 A1 | 2/2016 | Li et al. |
| 2016/0052800 A1 | 2/2016 | Dong |
| 2016/0060140 A1 | 3/2016 | Stein et al. |
| 2016/0075567 A1 | 3/2016 | Tour et al. |
| 2016/0152563 A1 | 6/2016 | Calmes, Jr. et al. |
| 2016/0200598 A1 | 7/2016 | Rajan et al. |
| 2017/0088439 A1 | 3/2017 | Thakur |
| 2017/0113202 A1 | 4/2017 | Shawabkeh et al. |
| 2017/0166446 A1* | 6/2017 | Chandran ................ C01B 3/58 |
| 2017/0334741 A1* | 11/2017 | Tsukamoto .......... B01J 20/2804 |

FOREIGN PATENT DOCUMENTS

| | | |
|---|---|---|
| EP | 0 270 675 | 6/1988 |
| GB | 1 466 150 | 3/1977 |
| JP | 2004068182 | 3/2004 |
| WO | WO 2009/065783 | 5/2009 |
| WO | WO 2009/139531 A1 * | 11/2009 |

OTHER PUBLICATIONS

Cheung et al., "Sorption Kinetic Analysis for the Removal of Cadmium Ions from Effluents Using Bone Char," *Water Research* 35(3):605-612, Dec. 12, 2001.
Creed et al., "Determination of Trace Elements by Stabilized Temperature Graphite Furnace Atomic Absorption, Revision 2.2," *Environmental Monitoring Systems Laboratory Office of Research and Development*, USEPA, Cincinnati, Ohio, 42 pages, May 1, 1994.
Environmental Protection Agency, "National Primary Drinking Water Regulations; Arsenic and Clarifications to Compliance and New Source Contaminants Monitoring," *Federal Register* vol. 66, No. 14, 91 pages, Jan. 22, 2001.
Frank et al., "The Preparation of Mercaptans from Alcohols," *Journal of the American Chemical Society* 68(10):2103-2104, Oct. 1946.
Hodge et al., "Polymer-supported Reactions in Organic Synthesis," Chapter 1, pp. 1-83, Sep. 3, 1980.
Hodge et al., "Polymer-supported Reactions in Organic Synthesis," Chapter 3, pp. 157-194, Sep. 3, 1980.
Lorenzen et al., "Factors Affecting the Mechanism of Adsorption of Arsenic Species on Activated Carbon," *Minerals Engineering* 8:557-569, 1995.
Martin et al., "Determination of Metals and Trace Elements in Water and Wastes by Inductively Coupled Plasma-Atomic Emission Spectrometry, Revision 4.4," *Methods for Determination of Metals*, 58 pages, May 1, 1994.
Maudling et al., "New Procedures for Making 2-(Chloromethyl)-4-nitroluene," *The Journal of Organic Chemistry* 48(17):2938-2939, Aug. 1983.
Nicomel et al., "Technologies for Arsenic Removal from Water: Current Status and Future Perspectives," International Journal of Environmental Research and Public Health 13:62, 2016.
Rachel et al., "Tailoring Activated Carbon by Surface Modification with O, S and N Containing Molecules," *Materials Research* 6:129-135, 2003.
Rivera-Utrilla, "Activated Carbon Modifications to Enhance Its Water Treatment Applications: An Overview," *Journal of Hazardous Materials*, 1787:1-23, 2011.
Rodda et al., "Modeling the Effect of Temperature on Adsorption of Lead (ii) and Zinc (ii) onto Goethite at Constant pH," *Journal of Colloid and Interface Science* 184(2):365-377, Dec. 25, 1996.
Saggu et al., "Short communication benzimidazoles with biphenyls: Synthesis of 5-substituted-2-n-propyl-1-[(2'-carboxybiphenyl-4-yl-)methyl] benzimidazoles," *Journal of the Indian Institute of Sciences* 82:177-182, May 2002.
Sandler et al., *Sourcebook of Advanced Organic Laboratory Preparations*, Chapter 18, 12 pages, Academic Press, Oct. 29, 1992.
Sinha et al., "Removal of Mercury by Sulfurized Carbons," *Carbon* 10:745-756, 1972.
Su et al., "Arsenate and Arsenite Removal by Zerovalent Iron: Kinetics, Redox Transformation, and Implications for In Situ Groundwater Remediation," *Environmental Science & Technology* 35(22):1487-1492, Feb. 13, 2001.
Wagner et al., *Synthetic Organic Chemistry*, Chapter 31, 14 pages, John Wiley & Sons, Inc., Jan. 1, 1953.
Willocq et al., "Active Carbon Functionalized with Chelating Phosphine Groups for the Grafting of Model Ru and Pd Coordination Compounds," *Journal of Physical Chemistry* 112:5533-5541, 2008.
Yantasee et al., "Electrophilic Aromatic Substitutions of Amine and Sulfonate onto Fine-Grained Activated Carbon for Aqueous-Phase Metal Ion Removal," *Separation Science and Technology* 39:3263-3279, 2004.
Yin et al., "Review of Modifications of Activated Carbon for Enhancing Contaminant Uptakes from Aqueous Solutions," *Separation and Purification Technology* 52:403-415, 2007.
Yoshitake et al., "Adsorption of Chromate and Arsenate by Amino-Functionalized MCM-41 and SBA-1," *Chemistry of Materials* 14(11):4603-4610, Oct. 9, 2002.

* cited by examiner

FIG. 12

SELECTIVE ADSORBENT FABRIC FOR WATER PURIFICATION

CROSS REFERENCE TO RELATED APPLICATIONS

This is a continuation of U.S. patent application Ser. No. 14/214,196, filed on Mar. 14, 2014, which in turn claims the benefit of U.S. Provisional Application No. 61/802,514, filed Mar. 16, 2013. Applicant's prior applications are incorporated herein by reference in their entirety.

TECHNICAL FIELD

The present disclosure relates generally to apparatus, systems and methods related to drinking water purification.

BACKGROUND

The pollution of ground and drinking water by metalloids, especially arsenic, a wide range of toxic metals, such as but not limited to, lead, mercury, cadmium, chromium, nickel, iron, cupper, platinum, and palladium, as well as various organic chemicals, has attracted increasing attention in recent decades throughout the world. Particularly, the contamination of water by arsenic has been one of the most serious health hazards and its remediation to the Level of Concern (LOC) (10 ppb) has proven challenging.

The presence of arsenic in waterways is due to both natural and anthropogenic causes. For example, arsenic may be released into waterways due to volcanic activity and from erosion of natural deposits such as rocks and terrain that has been burned due to forest fire. Further, arsenic may be released into waterways due to agricultural runoff, industrial production waste runoff, etc. For example, some fertilizers contain arsenic and further, industrial practices such as copper smelting, mining, and coal burning also contribute to arsenic in the environment.

Consuming excessive amounts of arsenic from drinking water may contribute to a number of mild to severe health effects. For example, arsenic has been linked to thickening and discoloration of the skin, stomach pain, nausea, vomiting, diarrhea, numbness of the extremities, partial paralysis, and blindness. Further, arsenic has been credited as a carcinogen and linked to cancer of the bladder, lungs, skin, kidney, nasal passages, liver, and prostate, as well as a factor contributing to cardiovascular disease.

Since ground water sources and surface water sources are susceptible to arsenic contamination, it is imperative to purify water from these sources prior to human and animal consumption. The World Health Organization (WHO) and US Environmental Protection Agency (EPA) have set the arsenic standard for drinking water at 0.010 parts per million (10 ppb) to protect consumers served by public water systems from the effects of long-term, chronic exposure to arsenic. While the EPA standard applies to municipal water treatment facilities, it is desirable to remove arsenic from other water treatment systems as well. Indeed, in the United States, the National Resources Defense Council estimates that over 34 million Americans drink from water supplies with average arsenic concentrations that pose unacceptable cancer risks.

Arsenic removal technology can be applied to large scale water treatment systems, small scale water treatment systems, point-of-use water treatment systems, well water treatment systems, portable water treatment systems, and other systems.

Previous solutions for removing arsenic from drinking water involve processes/technology such as flocculation, modified coagulation/filtration, modified lime softening iron oxide adsorption, activated alumina, ion-exchange, reverse osmosis, electrodialysis, subterranean arsenic removal (SAR), and metal loaded polymers. Flocculation and iron oxide adsorption techniques generally use an iron-based coagulant to remove arsenic by co-precipitation and/or adsorption. However, the toxic arsenic sludge resulting from coagulation often clogs the system and the toxic arsenic sludge has to be disposed of by concrete stabilization. While this may be a sufficient short term solution, the toxic arsenic sludge may leach over time and thus be reintroduced into the environment.

Ion-exchange has traditionally been used as a water-softening process and has some ability to remove arsenic. However, arsenic exists in two oxidation states in water depending on the oxidation-reduction conditions and the pH of the water. As(III) is usually associated with groundwater under anaerobic conditions, while As(V) is associated with surface water under aerobic conditions. As(III) is found as the neutral species, arsenous acid ($H_3AsO_3$), below pH 9. As(V) occurs as the monovalent and the divalent arsenate species, $H_2AsO_4^-$ and $HAsO_4^{2-}$, respectively, between pH 6 and 9. Ion-exchange is ineffective in removing non-charged arsenic(III) species. Further, the presence of sulfate and high total dissolved solids can significantly affect run length and maintaining an ion-exchange column is costly and requires a skilled technician.

Reverse osmosis and electrodialysis techniques can remove arsenic but result in high salinity waste water, which presents an issue in that it requires further waste water treatment. Further, both technologies are high cost. SAR technology utilizes an oxidation zone to trap iron and arsenic underground. The technology relies upon soil dwelling microorganisms to metabolize iron and arsenic and break these substances down to other molecular species. Such a technology is extremely expensive to develop and operate. In addition, this technique is not simple and requires well simulated (calculated) and balanced aquifer oxidation. Otherwise, the oxidation procedure will just lead to arsenic and iron co-precipitation rather than adsorption, resulting in the subsequent release of arsenic. Metal-loaded polymers and granular metal, especially Fe(III) are interesting due to the possibility to remove both As(III) and As(V), however, the arsenic binding is pH dependent and there remains the possibility of releasing the impregnated metal in solution and adversely affecting the quality of drinking water

SUMMARY

Embodiments for water purification systems are provided. In one embodiment, a system comprises a purification chamber comprising a selective adsorbent activated carbon fiber fabric including one or more selective functional groups that bind arsenic. The selective adsorbent fabrics may be differently functionalized and may include an arsenic-selective functional group configured to adsorb one or more ionic structures of arsenic.

One approach to overcome at least some of the issues presented above is to use a selective adsorbent fabric to selectively remove one or more arsenic species from contaminated water. In some embodiments, the selective adsorbent fabric may include an arsenic-selective functional group that binds at least one arsenic ionic species via adsorption. For example, the arsenic-selective functional group may sequester As(V) and/or As(III) species from water in which such ionic species are present. The selective adsorbent fabric may at least reduce the need for downstream waste water treatment since the selective adsorbent fabric does not produce a toxic arsenic sludge like previous methods. Further, such a selective adsorbent fabric may be easily manufactured and cost effective for use in any water treatment system.

It will be appreciated that the selective adsorbent fabric may be of any suitable size and geometric shape to accommodate virtually any type of waste water treatment system. For example, the selective adsorbent fabric may be configured for a large scale water treatment facility, a small scale water treatment facility, a point-of-use water treatment system, a well water treatment system, a portable water treatment system, and other systems.

The adsorbent fabrics may selectively adsorb arsenic, while precursors of the adsorbent fabrics may also adsorb various hazardous organic toxins such as, but not limited to, industrial effluent, pesticides, and various sources of Endocrine Disrupting Chemicals (EDCs) which have been gaining increasing concerns over their possible effects on human health. The pollution of ground and drinking water by the above mentioned organic chemicals has attracted increasing attention in recent decades all over the world.

The fabrics disclosed herein and treated physico-chemically also adsorb a wide range of toxic metals, such as, but not limited to, lead, mercury, cadmium, chromium, nickel, iron, cupper, platinum, and palladium.

BRIEF DESCRIPTION OF THE DRAWINGS

The disclosure is illustrated by way of example and not by way of limitation in the figures of the accompanying drawings, in which the like references indicate similar elements and in which:

FIG. 12 shows results of a repetitive application of toxic chemical solution on the column packed with ACF-SBX.

DETAILED DESCRIPTION

Exemplary purification systems for use in water treatment systems are illustrated herein. The purification system may optionally include one or more reservoirs such as an untreated reservoir and a treated reservoir. Further, the purification system may include a purification chamber, including one or more purification cartridges, also referred to herein as filtration modules. Briefly, by directing the untreated water through the filtration module, refreshed or treated water, also referred to herein as purified water, may be generated and used as clean water. Untreated water may include toxins such as arsenic from natural and/or anthropogenic sources, and such toxins may not be desirable in drinking water for human and animal consumption, for example.

Figure 1A:
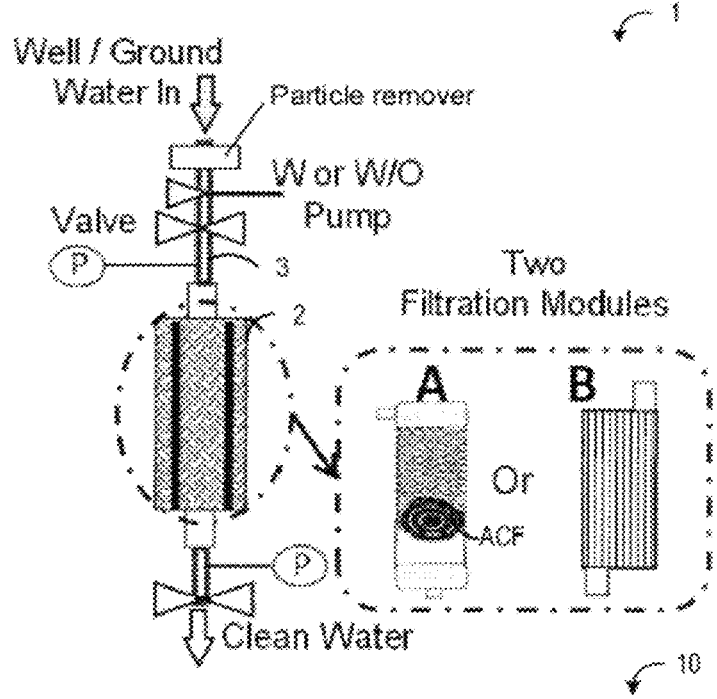
FIG. 1A shows a schematic illustration of an example water purification system, specifically a point-of-entry (P-O-E) type water purification system, according to an embodiment of the present disclosure.
Figure 1B:
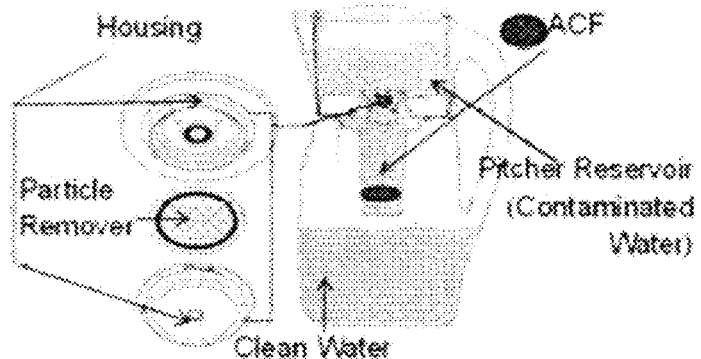
FIG. 1B shows another schematic illustration of an example water purification system, specifically a pitcher type water purification system, according to an embodiment of the present disclosure.
Figure 1C:
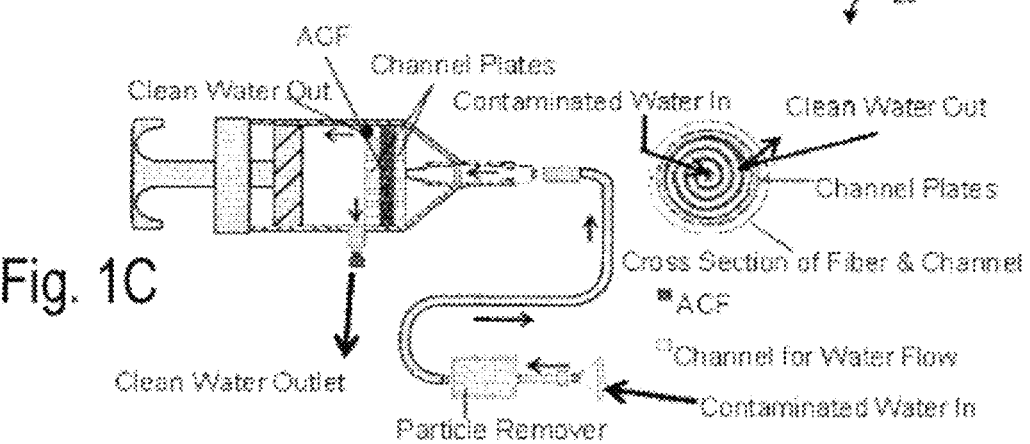
FIG. 1C shows another schematic illustration of an example water purification system, specifically a point of use type (portable) water purification system, according to an embodiment of the present disclosure.
Figure 1D:
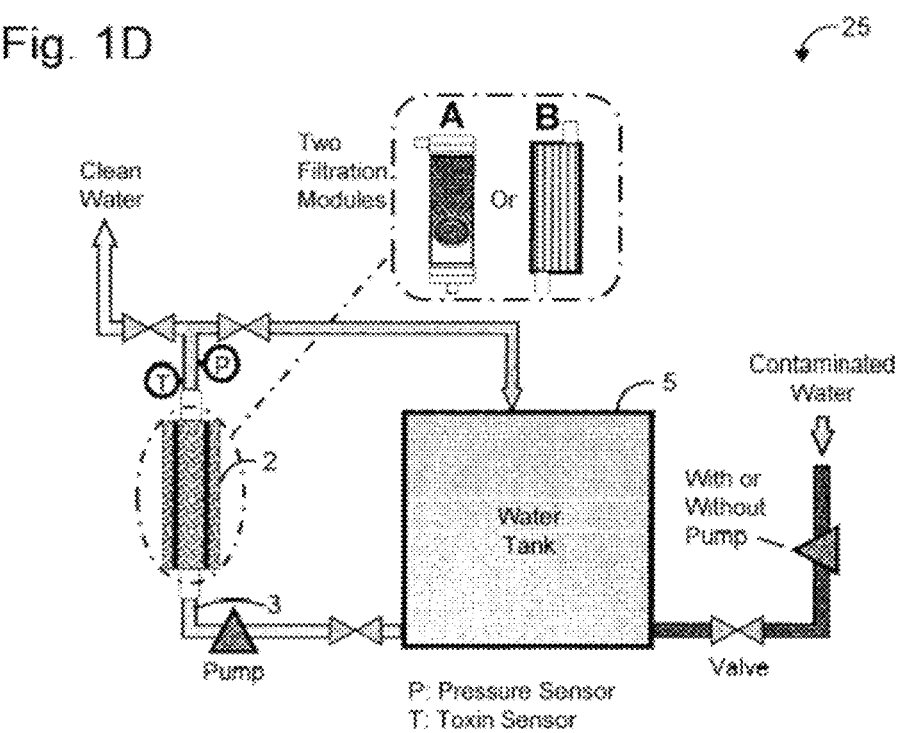
FIG. 1D shows a schematic illustration of an example water purification system according to an embodiment of the present disclosure.

Briefly, FIGS. 1A, 1B, 1C, and 1D are example water purification systems according to the disclosure. FIG. 1A shows a schematic illustration of an example water purification system 1, specifically a point-of-entry (P-O-E) type water purification system, according to an embodiment of the present disclosure. FIG. 1B shows another schematic illustration of an example water purification system 10, specifically a pitcher type water purification system, according to an embodiment of the present disclosure. FIG. 1C further shows another schematic illustration of an example water purification system 20, specifically a point of use type (portable) water purification system, according to an embodiment of the present disclosure. FIG. 1D shows another schematic illustrating of an example water purification system 25. It should be appreciated that these illustrations are for example and not intended to limit the types of configurations that the filtration modules can be applied. As such, these systems are provided for illustrative purposes and not to limit the disclosure.

As shown in FIG. 1A, each of the water purification systems may include a purification chamber 2 including a filtration module, such as, but not limited to a spiral wound (A) module or a flat module with zig-zag channel B. Adsorbents (functionalized activated carbon fibers (ACF)) adapted to selectively bind arsenic and/or other toxins may be housed in the filtration module.

It should be appreciated that although the reservoir (water tank) and purification chamber are shown as separate devices linked through couplers, such as a tubing system 3, one or more the chambers and/or reservoirs may be integrated together. Typically, the purification chamber is disposed intermediate the untreated reservoir and the treated reservoir, however other configurations may be possible. For example, FIG. 1D shows a purification system 25 including similar components as FIG. 1A, but also including an untreated water reservoir 5.

It should be appreciated that a tubing system may include fluid inflow and fluid outflow. Further, the tubing system may be a conduit connecting a fluid source (such as a ground water source) to the purification chamber. The tubing system may be continuous, and may connect various components, such as one or more reservoirs and the purification chamber. Various pumps, flow meters, pressure gauges, and toxin detectors may be provided to enable flow into and out of the purification chamber and reservoir(s).

Fluid, such as untreated water, may flow (or be pumped) into an untreated reservoir in the direction of the arrow. Untreated water may be stored in the untreated water reservoir, and when needed, may flow downstream.

The untreated water temporarily stored in the untreated water reservoir may flow (or be pumped) into the purification chamber in the direction of the arrow. The purification chamber may remove toxins from the untreated water using one or more toxin traps. For example, in some embodiments, the purification chamber may include a filtration module with fibers as described in more detail below. These fibers may be capable of trapping or retaining arsenic and/or other toxins. Once the toxins are removed, the water may be considered to be purified such that it is refreshed water. In some embodiments, the purification chamber may include, in addition to the toxin trap, one or more semi-permeable membranes to separate small particles which may be contained in the water such as ground water. In other embodiments, the purification chamber may be configured without a semi-permeable membrane or the like.

For example, the filtration module may include a selective adsorbent fabric that selectively removes toxins. The selective adsorbent fabric may adsorb arsenic from the untreated water flowing through purification chamber in an example. As described in more detail below, the selective adsorbent fabric may reduce the concentration of arsenic in the untreated water such that water exiting purification chamber includes minimal arsenic, and hence, may be referred to as purified water in this respect. The fabrics disclosed herein and treated physico-chemically may also adsorb a wide range of toxic metals, such as, but not limited to, lead, mercury, cadmium, chromium, nickel, iron, cupper, platinum, and palladium.

As described in more detail below, the fabric may be disposed within the filtration module to maximize water flow contact. In some examples, the filtration module may be a flat module configuration or a spiral wrapped configuration. Although these two modules are described in detail below, it should be appreciated that different configurations of the fabric within the cartridge are possible and are within the scope of the disclosure.

Treated water may flow (or be pumped) from the purification chamber to a treated water reservoir or other clean water outlet. It will be appreciated that treated water may flow downstream to an additional water treatment process and/or to a municipal end point (e.g. a faucet), for example. In some examples, highly contaminated water may be redirected back through the system until the toxins are sufficiently removed.

It will be appreciated that the directionality of the water flow is provided by way of example and as such is not meant to be limiting. The tubing system may be configured in any suitable form to transport water in any suitable direction. For example, one or more sections of tubing system may redirect the water flow in another direction than those illustrated in FIGS. 1A, 1B, 1C, and 1D. As such the spatial relationship between the optional one or more reservoirs and the purification chamber may be linear or non-linear. Further, the systems may include additional and/or alternative components than those illustrated in the example figures.

In some embodiments, the size requirements may be so reduced as to enable the purification system to be portable. By reducing the size of the purification system, a user may purify water in remote environments, for example, backpackers and travelers may use such a portable purification system. Further, pitchers and other systems may utilize the filtration module described herein.

It will be appreciated that various sensors may be used to monitor water quality, as shown in FIG. 1D. The sensors may include, but are not limited to, a pH sensor, electric conductivity (EC) sensor, and compact spectroscopic sensors. In some embodiments, redundant sensors may be employed to ensure high water quality in large scale water treatment system. A computer and/or smart phone (not shown) may be used to receive information from the sensors, control the pumps, and record the relevant data. Although not shown, it should be appreciated that various electronics may be provided within the water purification system to further control and monitor the purification process. Moreover, a user interface may be provided such that a user may have immediate information regarding the controls, sensors, and system control inputs.

It should be noted that in the disclosed system water is pumped through the purification chamber using one or more pumps. In some embodiments, the pumps may be roller pumps, while in alternative embodiments, the pumps may include air pumps, electrical pumps, manual pumps, or any combination thereof. In some embodiments, the pumps may be capable of adjusting the flow rate of the respective fluid that the respective pump is pumping.

In some embodiments, the purification chamber (or filtration module) may be manually detached from the tubing system, sensors, and other water treatment components and discarded and replaced with a new purification chamber. Thus, the filtration module may be considered a replaceable cartridge. As another alternative, the removed purification chamber may be dismantled to replace one or more disposable components housed within the purification chamber, such as an arsenic-selective fabric or a support screen. Once the disposable purification chamber component is replaced with a new component, the purification chamber housing may be closed and the purification chamber may be reattached to its original location in the water treatment system.

Figure 2:
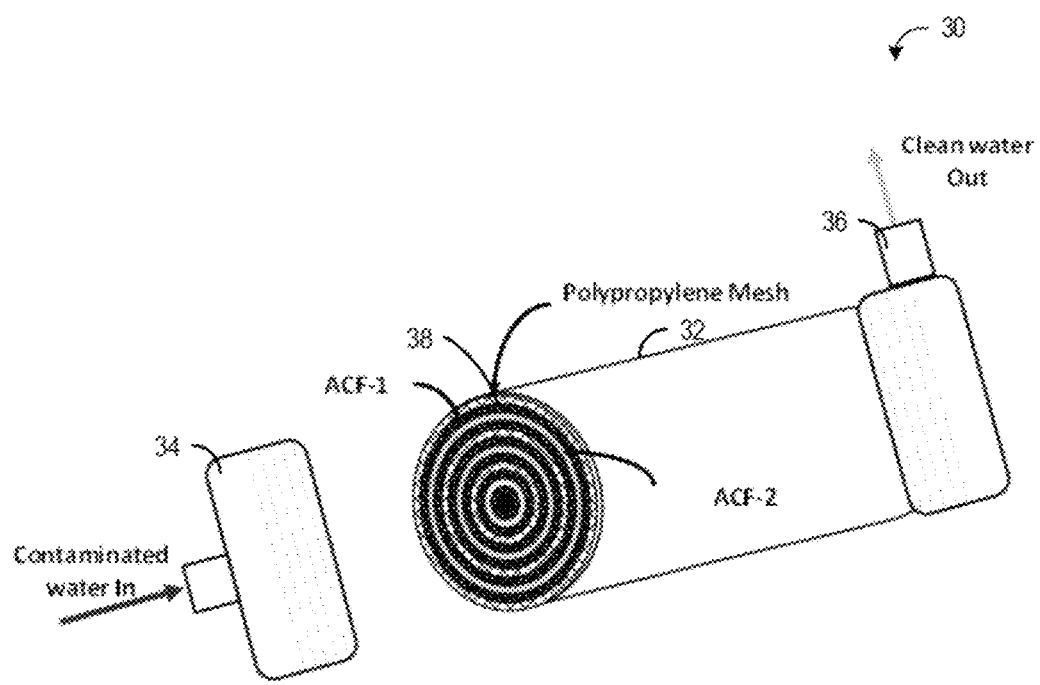
FIG. 2 shows a schematic illustration of an example purification cartridge (spiral-wound module) for use in the systems shown in FIGS. 1A, 1B, and 1C according to an embodiment of the present disclosure.

FIG. 2 shows a schematic illustration of an example purification cartridge 30, also referred to as a filtration module, for use in the system shown in FIGS. 1A-1D according to an embodiment of the present disclosure. The example filtration module may be comprised of a housing 32 having a fluid flow inlet 34 and at least one fluid flow outlet 36. The inlet and outlet may be part of a tubing system such that the filtration module is interposed between an untreated fluid reservoir and a refreshed fluid reservoir or clean water outlet, as described above.

As a non-limiting example, an inlet may be disposed in a cartridge top. The cartridge top may be configured to fit or couple to a cartridge or chamber housing. Coupled with or contained in the cartridge top and cartridge housing may be sealing devices, such as one or more O-rings and/or gaskets, such as a bottom gasket. Such sealing devices may be configured to maintain the system as a closed system and prevent leakage of water from the housing.

Further contained within the filtration module may be a selective adsorbent fabric 38. This selective adsorbent fabric may remove toxins from the water while substantially maintaining the appropriate levels of minerals which influence the taste of the water as well as promote desired body salt balance. The fabric may be formed of a sufficient tortuosity and thickness to ensure good contact with the water flow. Further, the fabric may be wrapped, wound, or otherwise positioned to increase the surface area of the fabric to the water flow.

As described above, untreated water (toxin-laden water) may be introduced into the filtration module through an inlet. The untreated water may encounter the selective adsorbent fabric. The toxins may be captured by the fabric and retained such that refreshed water exits through an outlet. In some embodiments, the toxins may be retained within the fabric or along the screen. In other embodiments, a second outlet, such as elimination port, may be provided to remove the trapped toxins. Toxins may be released through the elimination port such that the toxins are not retained in either the purification chamber or circulated back to a reservoir.

FIG. 2 further illustrates an example configuration for the filtration module. Specifically, the filtration module may be a spiral wound design or configuration. The spiral wound design is described in more detail herein.

Figure 3:
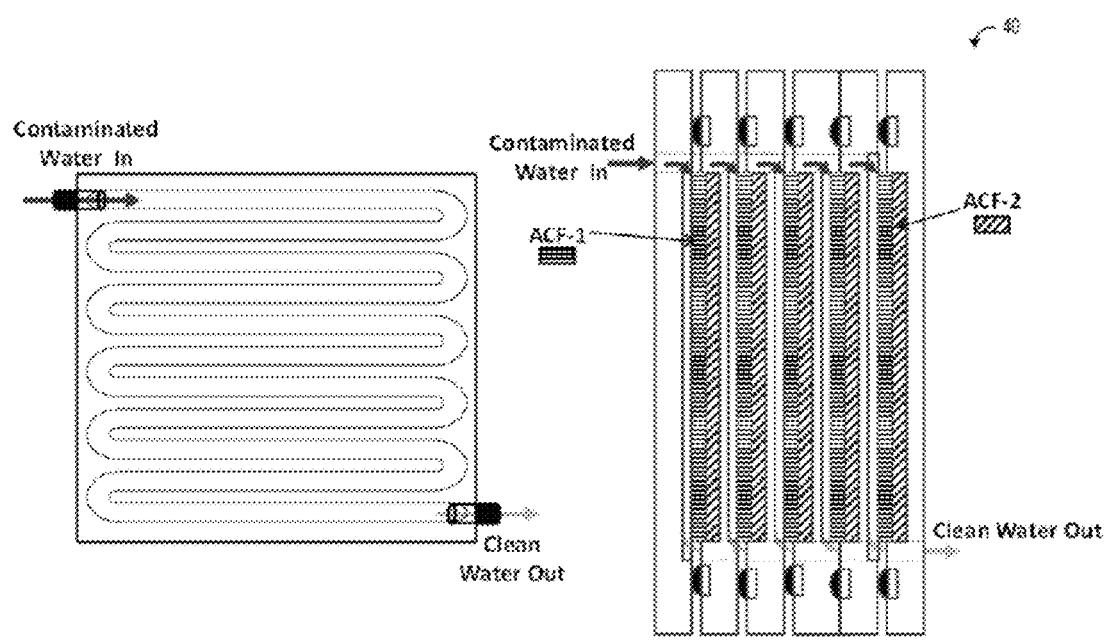
FIG. 3 shows a schematic illustration of a bottom plate of an example purification cartridge (flat module with zig-zag channel module) for use in the systems shown in FIGS. 1A, 1B, and 1C according to an embodiment of the present disclosure.

Turning now to FIG. 3, FIG. 3 provides a schematic illustration of another example filtration module 40. In the illustrated example, the filtration module includes a flat module configuration (with zig-zag channel module).

Regardless of the configuration, the toxin-laden water is directed into the filtration module (such as the module in either FIG. 2 or FIG. 3) through the ground/well water inlet or other water inlet and flows through the module along the fabric path to the clean water outlet. The selective adsorbent fabric may contain one or more fibers, such as activated carbon fibers (ACF), ACF-SH which catches both As(III) and As(V), and ACF-SBX which catches As(V) and a wide spectrum of toxic organic chemicals. The ion-selective fibers may be configured to selectively capture one or more toxins. Although described in relation to a single fiber, it should be appreciated that the fabric/fiber may include one or more fibers and such fabric/fibers may interact together to form a toxin trap.

It should be appreciated that any suitable fiber may be used. In some embodiments, the fabric may be composed of carbon fibers or other suitable fiber-like materials, including plastics, polymers, resins, silicone, cotton, etc. Further, in some embodiments, as an alternative, particles, aggregates, weaves, rings, tubes, such as grapheme, carbon nanotubes, etc., may be used in place of fibers. In some embodiments, the fibers may be acid-treated or oxidized, while in other embodiments, the fibers may not be acid-treated or oxidized.

Additionally, the fibers may be activated fibers or non-activated fibers. Further, the fibers may be nanofibers. For example, in one embodiment, the fibers may be activated carbon fibers. Activated carbon fibers may be made by the carbonization and activation of precursor fibers (e.g. polyacrylonitrile, phenol resin, pitch, rayon, cotton, etc.) at high temperature and in the flow of air containing oxygen, or in the flow of inert gas such as nitrogen or argon.

For example, activated carbon may be made by burning hardwood, nutshells, coconut husks, cottons, animal bones, pitch, carbon-containing polymers (such as rayon, polyacrylonitrile, etc.), and other carbonaceous materials. The charcoal becomes "activated" by heating it with steam, carbon dioxide, or carbon monoxide to high temperatures in the absence of oxygen. This heating removes any residual non-carbon elements and produces a porous internal microstructure with an extremely high surface area.

Further, activated carbon fibers may be subject to washing treatments and/or further heat treatment to increase consistency of batch-to-batch samples. As one example, activated carbon fibers may be heated at 325° C. for 8 hours. As another example, activated carbon fibers may be heated at 300° C. for 24 hours. These additional heat treatments may increase the surface area, pore size stability, meso pores, crystalline structures, C—O and C=O (if under the air), and decrease in hydrogen content. Therefore, it will be appreciated that activated carbon fibers may be subject to any pre-treatment including washing and heating, and further, that duration, frequency, temperature, etc., of washing/or heating may be a suitable value.

In one embodiment of the present disclosure, the selective adsorbent fabric may include one or more arsenic-selective functional groups, or another arsenic- or toxin-selective functional group. Alternative embodiments may include traps selective for other waste products to be purified including, but not limited to, mercury, lead, cadmium, copper, and other heavy metals, ammonia, and other organic and inorganic contaminants.

Any suitable fabric may be used as a selective adsorbent fabric. The arsenic-selective fibers may be disposed in any orientation, for example, the fibers may be in an overlapping, bi-parallel orientation. It should be appreciated that the fibers may be oriented in a variety of patterns, including a chaotic arrangement. Fibers may be uniform or variable sizes within fabric. Although not illustrated in FIG. 2, bound enzymes and/or microbial biofilms may be disposed along the fibers for use in decomposition of arsenic. For example, arsenic may be metabolized by enzymes and/or microbial species via methylation, demethylation, oxidation, and/or reduction reactions. Other select enzymes, for decomposition and/or trapping of other toxins, may also be selectively disposed along the fibers.

Fibers may be produced using a furnace in house and/or be commercially available activated fibers (AF). In some embodiments, activated carbon fibers (ACF) and fabrics are used. One exemplary fiber for use in the purification system described herein may be a basket weaved fiber with a specific surface area of 600/m$^2$/g to 2,000 m$^2$/g. Another exemplary fiber for use in the purification system described herein may be felt type, which may have a similar specific surface area. Although an exemplary fiber is provided, other fabrics and fibers may be used with wide ranges of density, specific surface area, pore structures, and pore size distributions without departing from the scope of the disclosure. For example, other commercially-available economical fibers or prepared fibers/fabric may be used because the economy of the water purification system is one of the most critical factors.

It should be noted that the fibers may have a three-dimensional configuration. Within the three dimensional configuration, the fibers may be disposed such as to form macropores, mesopores, micropores, and nanopores, or structures that may contain select functional groups. Such structures may be configured to trap or retain select ions and organic toxins. For example, the pores may be charged to selectively trap oppositely-charged ions. In one example, the pores may be positively charged, thus configured to attract and trap negatively-charged ions, such as arsenic(V) and chemicals rich with functional groups with partially negatively charged and/or high electron density and/or rich in π electrons.

Once a fabric is selected, the fabric fibers may be prepared for use as the selective adsorbent fabric. In some embodiments, the fiber surface may be modified to increase the concentration of oxygen-containing functional groups. The modification to the surface may be such that the surface of the fiber is oxidized. For example, the surface may be modified by treating the selective adsorbent fabric with nitric acid ($HNO_3$) and sulfuric acid ($H_2SO_4$) to achieve the addition of carboxylic acid groups and hydroxyl groups to the selective adsorbent fabric. In some examples, fibers will be functionalized to create functionalized activated carbon fibers, such as ACF-$SO_3H$, ACF-$PO_3H$ and ACF-$NH_2$; ACF functionalized with amino groups (several surface modification methods are available); ACF-SBX; ACF functionalized with strongly-basic anion-exchange groups as shown in the figures, etc.

Further, the fabric fibers may be additionally prepared for use as the selective adsorbent fabric. In some embodiments, the fiber surface may be modified to increase the concentration of sulfur-containing functional groups, and/or other non-metal-containing functional groups. The modification to the surface may be such that the surface of the fiber is sulfided. For example, the modification to the surface may be such that the surface of the fiber contains a methyl sulfide (SH), also referred to as a thiol or a mercaptan. For example, the surface may be modified by treating an oxidized selective adsorbent fabric with thiourea ($CH_4N_2S$), hydrogen bromide (HBr), and/or sodium hydroxide (NaOH) to achieve the addition of a methyl sulfide to the selective adsorbent fabric.

Any suitable method may be used to modify the surface, including, but not limited to, heat treatments, peroxide treatments, acid treatments, etc. Modification of the surface of the fiber to include high oxygen concentration and higher relative concentration of carboxylic and hydroxyl groups may provide the functional groups for sulfur binding and enable further modification of the fiber. It should be appreciated that surface, as used herein, may be any portion of the fiber that may be exposed or exposable to the water flow.

Additional examples of the filtration modules and the configuration of the fabric and water flow path are further illustrated in FIG. 3. Specifically, FIG. 3 provides an example illustration of a bottom plate for water purification as disclosed herein. It should be appreciated that the dimensions are provided by way of example and are not a limitation. Any suitable size fabric, system or configuration may be prepared based on the use application for the filtration module.

Returning to FIG. 2, the selective adsorbent fabric 38 (illustrated herein as an ACF-1 fabric) is wrapped around a central core with sufficient tortuosity and thickness to ensure good contact between the radial-flowing feed (e.g., untreated water) and the adsorbent. An additional type of activated carbon fiber, illustrated as ACF-2, may be included when desired. It should be appreciated that an alternative method for constructing the spiral wrapped modules is to wrap pre-woven ACF cloth or fabric around a central core. Further, these ACF clots may be co-wrapped with an adequate carrier such as polypropylene mesh, so that the feed solution is forced to travel in a spiral pattern from the central feed core to the outer collection shell.

Figure 4:
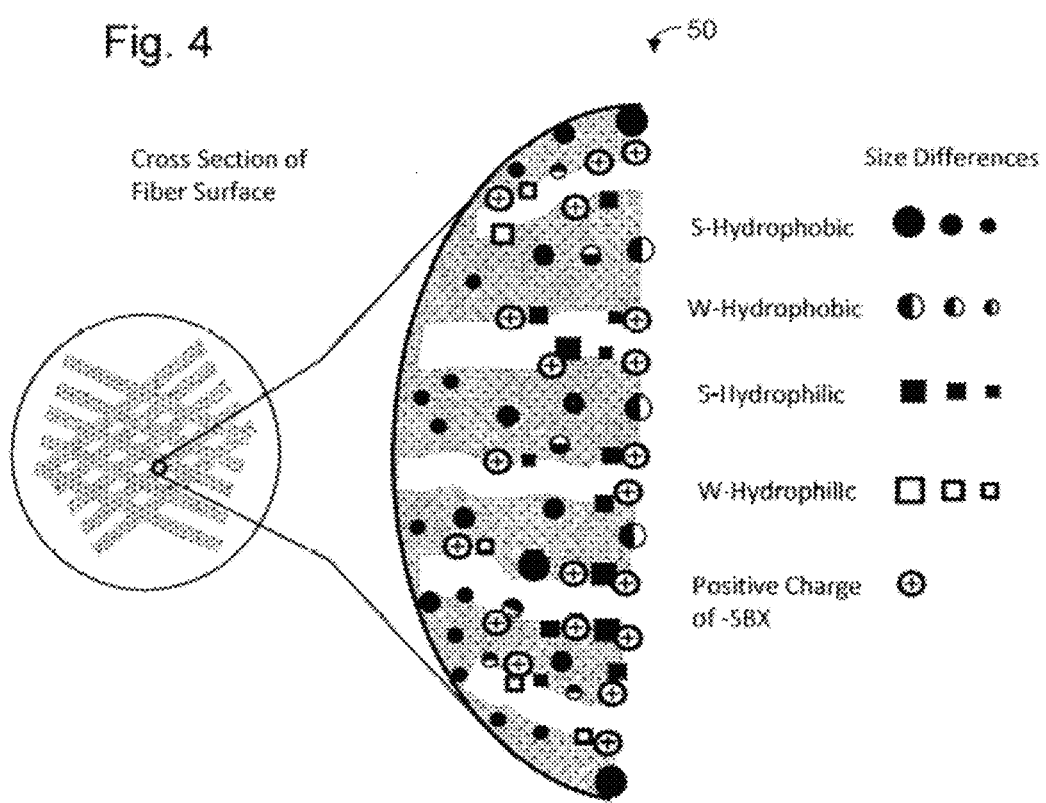
FIG. 4 provides a cross-sectional view of an example selective adsorbent fabric (ACF-SBX) included within the purification cartridge or module which adsorbs a wide spectrum of organic toxins with different hydrophobicity, hydrophilicity (S, strong; W, weak), and molecular sizes as well as arsenic (As(III) and As(V)).

FIG. 4 provides a cross-sectional view of an example selective adsorbent fabric 50 (ACF-SBX) which adsorbs a wide spectrum of organic toxins with different hydrophobicity, hydrophilicity, and molecular sizes as well as As(V).

Figure 5:
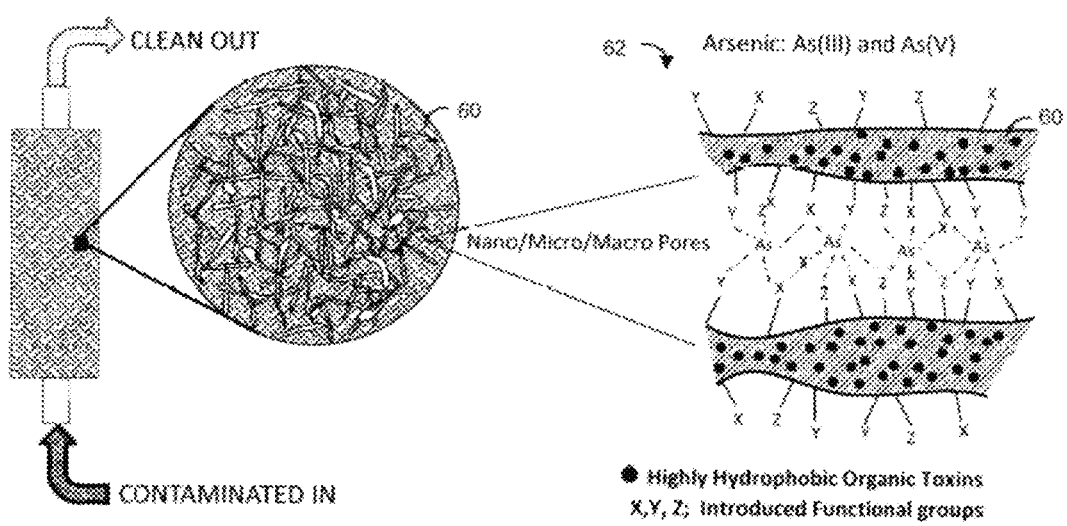
FIG. 5 shows a schematic illustration of an example surface-modified selective adsorbent fabric interacting with selected highly hydrophobic organic toxins and ionic species of the selected toxins, such as As(III) and As(V) that interact with the example surface-modified selective adsorbent fabric according to an embodiment of the present disclosure.

FIG. 5 shows a schematic illustration of an example surface-modified selective adsorbent fabric 60 interacting with a selected toxin and example ionic species of the selected toxin that interact with the example surface-modified selective adsorbent fabric 60 according to an embodiment of the present disclosure. FIG. 5 provides specific ligands that can be attached to activated carbon fibers (ACF) by physical and chemical treatments. In an example, the groups X, Y, and Z of FIG. 5 refer to X; —SH, Y; —COOH, Z; —OH, —C═O, —NH, and etc. It should be noted that some functional groups are introduced from opposite screen in 3-dimensional scheme. Diversity of coordination schemes of arsenic with functional groups in proximity in ACF-SH (III) matrix could be possible. Namely, both As(III) and As(V) are able to coordinate with multiple neighboring functional groups, resulting in stabilized arsenic absorbed. Some hydrogen bonds will be formed via surface coordinated water molecule. Secondary interaction of arsenic with π electrons of carbon aromatic rings are not shown.

Figure 6:
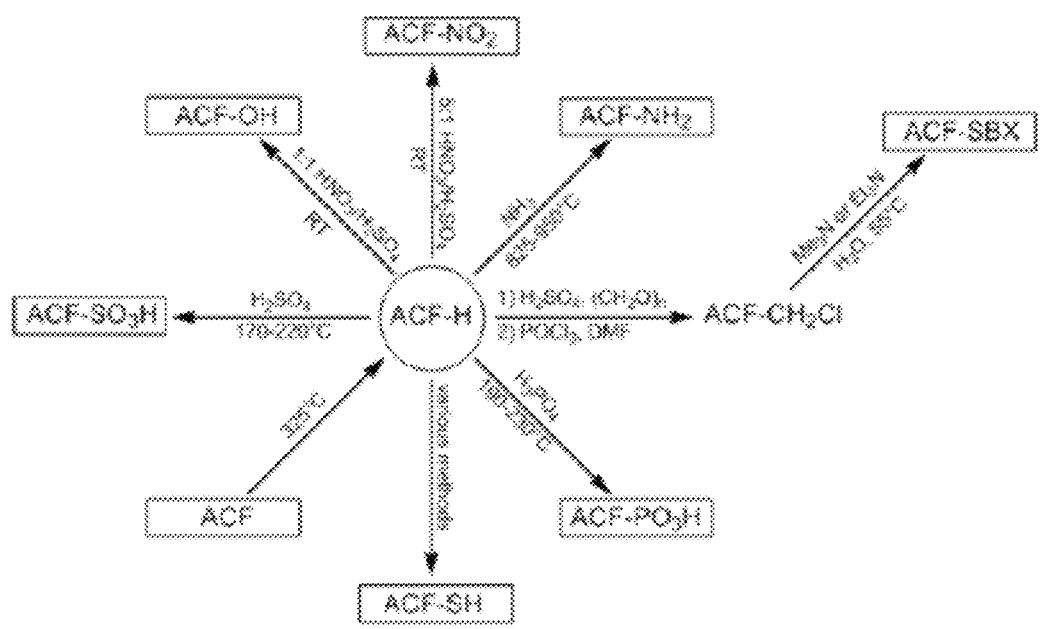
FIG. 6 provides an example overview of selected surface modifications of fiber to prepare specific adsorbent fabrics interacting with selected toxins.

FIG. 6 provides an example overview of selected surface modifications of fibers to prepare specific adsorbent fabrics interacting with selected toxins. As used herein ACF refers to Activated carbon fiber; ACF-H refers to heat treated ACF (Stabilized nano-/micro-pore structures, Increased surface area, Increased crystal structures, Decreased hydrogen content, Increased C—O and C═O); ACF-OH refers to acid oxidized ACF at room temperature (Increased C—O, C═O and —COOH); ACF-SO3H and ACF-PO3H refer to ACF functionalized with —SO3H and —PO3H, respectively. ACF-NH2 refers to ACF functionalized with an amino group (several surface modification methods are available); and ACF-SBX refers to ACF functionalized with strongly-basic anion-exchange groups such as trialkylamines (methylamine, ethylamines and other alkylamines). There are several preparation methods available for ACF-SBX.

ACF-SBX, ACF-H, ACF-OH and ACF-NH2 are all reasonably good adsorbents for various organic toxins. Particularly, ACF-SBX and ACF-H are very good adsorbents for various organic toxins, as shown in Table 1 below.

TABLE 1

Kinetic Data for Adsorption of Organic Toxins to ACFs.

| Chemical | M.W. | Conc. (mg/dL) | ACF-H 50% | ACF-H >95% | ACF-OH 50% | ACF-OH >95% | ACF-SBX 50% | ACF-SBX >95% | Log P‡ | HBD■ | HBA■ |
|---|---|---|---|---|---|---|---|---|---|---|---|
| anthracene | 178.2 | 0.9 | ◆0.5 | 53.0 | 0.4 | 30.0 | 0.4 | 12.5 | 4.49 | 0 | 0 |
| atrazine | 215.7 | 1.8 | 2.0 | 20.0 | 6.0 | (90%) | 1.6 | 10.0 | 2.61 | 2 | 5 |
| bisphenol A | 228.3 | 10.0 | 5.0 | 30.0 | 45.0 | (70%) | 4.0 | 30.0 | 3.32 | 2 | 2 |
| DEHP† | 390.6 | 6.9 | 20.0 | 80.0 | 43.3 | (92%) | 3.8 | 20.0 | 7.80 | 0 | 4 |
| chloramine-T | 227.6 | 15.0 | 3.3 | 25.0 | 50.0 | (82%) | 3.3 | 25.0 | N/A | 0 | 3 |

TABLE 1-continued

Kinetic Data for Adsorption of Organic Toxins to ACFs.

| Chemical | M.W. | Conc. (mg/dL) | ACF-H 50% | ACF-H >95% | ACF-OH 50% | ACF-OH >95% | ACF-SBX 50% | ACF-SBX >95% | Log P[‡] | HBD[■] | HBA[■] |
|---|---|---|---|---|---|---|---|---|---|---|---|
| chlorobenzene | 112.6 | 16.0 | 0.3 | 2.0 | 0.3 | 2.0 | 0.3 | 2.0 | 2.84 | 0 | 0 |
| p-cresol | 108.1 | 15.0 | 2.0 | 30.0 | 20.0 | (89%) | 1.5 | 60.0 | 1.97 | 1 | 1 |
| deca-BDE[†] | 959.2 | 0.3 | 0.4 | n.d. | n.d | n.d. | 0.5 | n.d. | 9.97 | 0 | 1 |
| 2,4-dichlorophenol | 163.0 | 15.0 | 1.5 | 30.0 | 2.6 | (92%) | 2.3 | 30.0 | 3.17 | 1 | 1 |
| 2,4-D[†] | 221.0 | 15.0 | 5.0 | 60.0 | 15.0 | (85%) | 5.0 | 30.0 | 2.81 | 1 | 3 |
| o-dichlorobenzene | 147.0 | 14.0 | 1.5 | 3.0 | 1.5 | 3.0 | 0.8 | 3.0 | 3.38 | 0 | 0 |
| p-dichlorobenzene | 147.0 | 17.0 | 1.0 | 2.0 | 1.0 | 2.0 | 1.0 | 2.0 | 3.44 | 0 | 0 |
| diethyl phthalate | 222.2 | 15.0 | 5.0 | 50.0 | 60.0 | (69%) | 3.5 | 25.0 | 2.42 | 0 | 4 |
| diuron | 233.1 | 5.0 | 3.0 | 15.0 | 30.0 | 55.0 | 3.0 | 15.0 | 2.77 | 1 | 1 |
| ethylbenzene | 106.2 | 15.0 | 0.3 | n.d. | 0.3 | 0.5 | 0.3 | n.d. | 3.15 | 0 | 0 |
| 17β-estradiol | 272.4 | 4.6 | 0.5 | 10.0 | 0.5 | 50.0 | 0.5 | 10.0 | 4.03 | 2 | 2 |
| 4-nitrophenol | 139.1 | 11.0 | 0.8 | 20.0 | 5.0 | 60.0 | 1.5 | 20.0 | 1.91 | 1 | 3 |
| NDEA | 102.1 | 15.0 | 3.8 | (93%) | 30.0 | (59%) | 4.6 | 60.0 | 0.48 | 0 | 3 |
| 4-nonylphenol | 220.4 | 15.0 | 2.0 | 30.0 | 57.0 | (73%) | 5.0 | 45.0 | 5.76 | 1 | 1 |
| triclosan | 289.5 | 5.0 | 2.5 | 55.0 | 26.0 | (91%) | 1.7 | 46.7 | 4.53 | 1 | 2 |
| uric acid | 168.1 | 15.0 | 3.0 | 30.0 | 15.0 | 60.0 | 3.0 | 30.0 | −2.92 | 4 | 3 |

*Estimated time to achieve designated toxin removal (min). All experiments were performed in Standard Synthetic Test Water (STW) which was prepared by dissolving 31.90 mg $Na_2SiO_3 \cdot 5H_2O$, 252.06 mg $NaHCO_3$, 61.60 mg $MgSO_4 \cdot 7H_2O$, 50.85 mg $MgCl_2 \cdot 6H_2O$, and 147.20 mg $CaCl_2 \cdot 2H_2O$ in 1 L ultra-pure DI water. The pH is adjusted to 6.9~7.0.
[†]DEHP; bis(2-ethylhexyl)phthalate, deca-BDE; decabromodiphenyl ether, 2,4-D; 2,4-dichlorophenoxy acetic acid.
[‡]Logarithm of measured partition coefficient,
[■]HBD; hydrogen bond donors, HBA; hydrogen bond acceptors.

ACF-SBX was the best sorbent for rapidly removing a wide spectrum of organic chemicals. ACF-H was found to be a fairly good adsorbent as well although it was not a good adsorbent for anthracene, DEHP, and some other tested chemicals. ACF-SBX also appears to be a good sorbent for chemicals rich in hydrogen bond acceptors. Although the levels of all of these toxic chemicals in ground water are generally quite low (ppb level), initial adsorption studies were performed at much higher concentrations (ppm level) to readily screen them with minimal errors. One liter of water contaminated with total 100 ppb range (high contamination level) of typical organic toxin mixtures will be rapidly (seconds level) removed by 0.1 g ACF-SBX. The loading capacity of ACF-SBX and ACF-H for most of toxins in Table I is the range of 150 mg~300 mg/g. Assuming a total organic contamination of 500 ppb (one of the highest cases in the drinking water/well water), 14 liters of drinking water per day (standard for four member family), the cartridge containing 100 gram of ACF-SBX filter would clear organic toxins through one year. Thus, ACF-SBX will be very powerful water purifier and suitable for use as water faucet attached purification device. The strength of ACF-SBX is that it is able to adsorb As(V) in addition to various toxic organic chemicals.

It should be appreciated that there is diversity of coordination schemes of arsenic with functional groups in proximity in a ACF-SH (III) matrix as shown in FIG. 5. As(III) is capable of forming three strong covalent bonds but often interacts weakly with additional electron donor ligands. Usually, one weak donor-acceptor interaction predominates. However, when electron donors are appropriately arranged, the total inner coordination number of As(III) can include as many as three weak donor-acceptor interactions in addition to three strong covalent bonds. Other ion-species, As(V) can form as many as five strong covalent bonds. Pentavalent arsenic can also behave as a Lewis acid and weakly interact with additional electron donor ligands. Some hydrogen bonds will be formed via surface coordinated water molecule as shown in FIG. 5. Secondary interaction of arsenic with π electrons of carbon aromatic rings is not shown.

The strength of the ACF material is the ability to vary pore dimensions and customize pockets with multiple ligands to attract and sequester arsenic. N and O heteroatoms can be positioned within and upon the ACF material to take advantage of favorable non-bonding donor-acceptor interactions with arsenic. The ACF material can be functionalized with ligands to attract and tightly sequester arsenic through multiple bonding interactions. The proximal location of different functional groups with complimentary bonding modes can enhance binding of arsenic. Optimum binding of arsenic is dependent on the location and proximity of ligands as well as the dimensions of the layers and pockets within the ACF material.

The degree of the proximity (distance) and number of coordination between arsenic and functional groups will be controlled by the preparation methods of ACF-SH (III) from the ACF-H including the oxidation of ACF-H as well as the heat treatment condition of ACF to prepare the ACF-H. And, the apparent maximal adsorption capacity of ACF-SH (III) varies, for example in a range of 5 mg/g to 30 mg/g, for both As(III) and As(V) in the STW environment. ACF-SH (III) is also an effective adsorbent for lead and mercury in the STW environment with adsorption capacity of more than 60 mg/g for both toxic metals.

Figure 7:
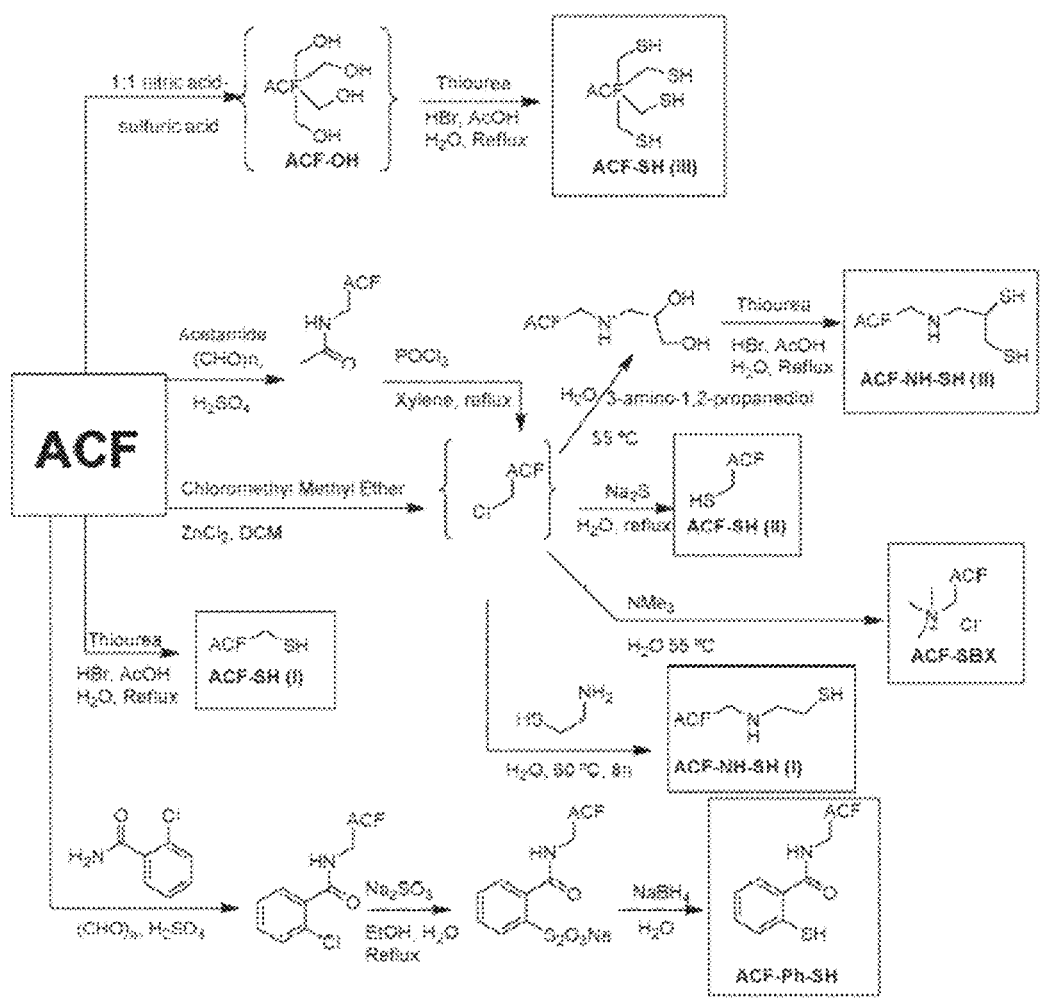
FIG. 7 shows a schematic of the synthesized ACF functionalized with arsenic-specific ligands
Figure 8:
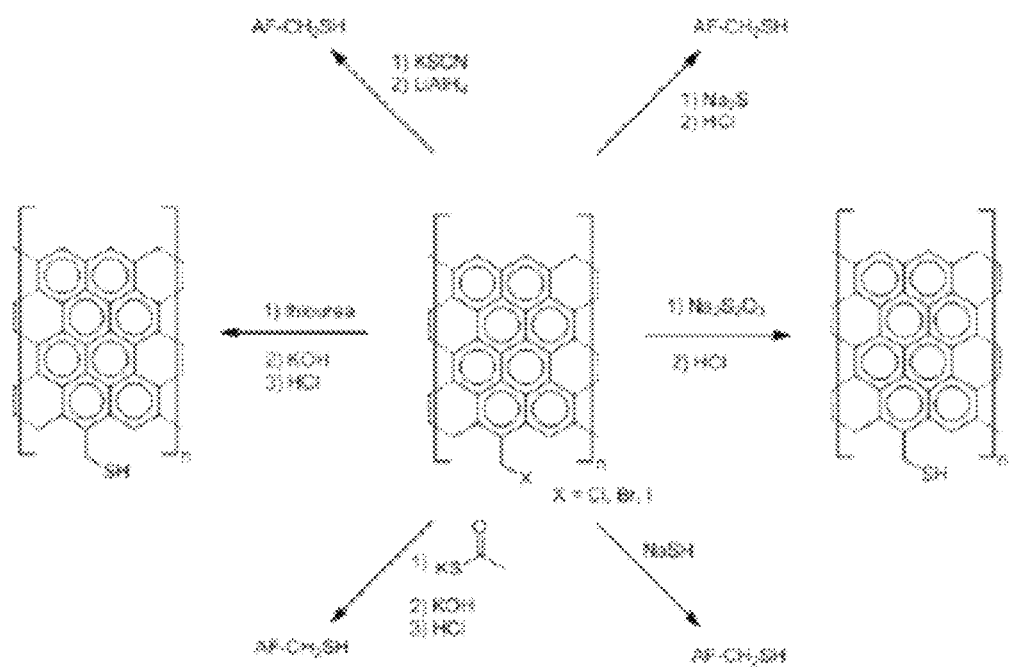
FIG. 8 shows methods for thiolation of benzylic halides.

FIGS. 7 and 8 illustrate example modifications to the ACF to attach arsenic-specific ligands to the fibers. FIG. 7 shows a schematic of the synthesized ACF functionalized with arsenic-specific ligands. FIG. 8 shows methods for thiolation of benzylic halides.

The following case studies are provided as examples of the functionality of various arsenic-selective functional groups incorporated into activated carbon fibers.

Case study #1: Preparation of chloromethyl ACF (ACF-CH$_2$Cl)

ACF-CH$_2$Cl is a key intermediate in the production of a subset of the arsenic-selective fabric fibers and also for ACF-SBX production, presented below. ACF-CH$_2$Cl was prepared through two different routes. The first method used the reaction of the ACF with paraformaldehyde and acetamide in the presence of sulfuric acid under a nitrogen atmosphere. This method has been readily utilized for the chloromethylation of aromatic compounds. Briefly, the ACF were heated in the sulfuric acid containing paraformaldehyde (1 equivalent) at 55° C. for 5 hours. Acetamide (3 eq.) was added to the reaction medium in portions and maintained the reaction mixture at 55° C. for 8 hours. ACF was extensively washed with water, toluene and finally ether before drying in vacuo. The ACF was placed in xylene containing phosphorus oxychloride (2 eq.) and dimethylformamide (1 eq.), and subsequently the mixture was heated to reflux for eight hours under a nitrogen atmosphere. The ACF-$CH_2$—Cl was washed with water and ether to remove any unreacted materials and contaminants. The ACF-$CH_2$—Cl was then dried in vacuo, and stored under nitrogen until use.

In the alternative method, ACF was reacted with chloromethylmehtyl ether (1. equivalent) and zinc chloride (0.1 eq) in dichloromethane at 50° C. for 8 hours under a nitrogen atmosphere. The ACF was extensively washed with methanol, and subsequently with water before drying in vacuo. ACF-$CH_2$Cl was stored under nitrogen until use. The ACF-$CH_2$—Cl may be used to prepare ACF-SH (II), ACF-NH—SH (I), ACF-NH—SH (II), and ACF-SNX, presented below.

Case Study #2: ACF-SH (II)

ACF-SH (II) was prepared by reaction of ACF-$CH_2$—Cl with sodium hydrosulfide. Methods for the preparation of aromatic and aliphatic: thiols have been extensively reported in the literature. Briefly, the ACF-$CH_2$—Cl was placed in water containing sodium sulfide (1 eq.) and the mixture heated to reflux for 8 hours under a nitrogen atmosphere. The reaction was terminated by soaking the ACF in hydrochloric acid. The ACF-SH was washed extensively with water and dried in vacua. The prepared ACF-SH (II) was stored under nitrogen until use.

Case Study #3: ACF-NH—SH (I)

The ACF-NH—SH (I) was prepared through the reaction of the ACF-$CH_2$—Cl with 2-aminoethanethiol (1 eq.) in water at 60° C. for 8 hours. The reaction was carried out under a nitrogen atmosphere. The ACF-NH—SH (I) then was extensively washed with water before drying in vacua. The prepared ACF-NH—SH (I) was stored under nitrogen until use.

Case Study #4: ACF-NH—SH (II)

The ACF with multiple thiol groups (ACF-NH—SH (II)) was prepared by reacting ACF-$CH_2$—Cl with 3-amino-1,2-propandiol (1 eq.) in water at 60° C. for 7 hours under a nitrogen atmosphere. The ACF was washed with water, and subsequently refluxed with thiourea (1 eq.) and hydrobromic acid (1 eq.) in water for 16 hours under a nitrogen atmosphere. The reaction was cooled to medium to room temperature and sodium hydroxide was added (2 eq.), and then the reaction was refluxed medium again for 16 hours under a nitrogen atmosphere. The functionalized ACF was extensively washed with water until the solution reached to a neutral pH. The ACF-NH—SH (II) was dried in vacua and stored under nitrogen until use.

Case Study #5: ACF-SBX

The ACF-SBX which is ACF functionalized with strongly-basic anion-exchange groups was prepared by reacting ACF-$CH_2$—Cl with trialkylamines. This method is commonly used to functionalize polystryene resins with strongly basic anion exchange groups. The resulting ACF-SBX was washed with ether and water, and then washed the salt form with water until the pH reached neutral. ACF-SBX was stored in water until use. Briefly, the ACF-SBX was prepared by reacting the ACF-$CH_2$—Cl with trimethylamine (1 eq.) in water at 55° C. for 5 hours under a nitrogen atmosphere. The ACF was washed with water, dilute sodium hydroxide and water. The ACF-SBX was converted to the chloride form by treating it with 0.1 M hydrochloric acid. The fabric was washed extensively in water before drying in vacuo.

The Case Study #7: ACF-SH

ACF-SH may be prepared without utilizing the ACF-$CH_2$—Cl. The ACF-SH was first prepared via synthesis of the intermediate, choloromethyl ACF (ACF-$CH_2$—Cl) and was designated ACF-SH (II). We also attempted to prepare ACF-SH, designated as ACF-SH (I), through a more direct reaction of ACF with thiourea. This was to pursue the more economic route of the preparation of ACF-SH. Specifically, ACF was reacted with thiourea (1 eq.) and hydrobromic acid (1 e.q) in water at 100° C. for 16 hours under a nitrogen atmosphere, The reaction was cooled to medium to room temperature and added sodium hydroxide (2 eq.) and then the medium was refluxed for 16 hours at 100° C. under a nitrogen atmosphere. The modified ACF was extensively washed with water until the solution reached to a neutral pH before drying in vacuo. The prepared ACF-SH (I) was stored under nitrogen until use.

Case Study #8: ACF-SH (III)

We proposed that the increase in —OH groups of ACF would increase the subsequent formation of —SH groups on the ACF with thiourea, described previously. Therefore, we attempted to increase the density of —OH through rigorous oxidation of ACF according to the method developed in house as described below. ACF-SH (III) may be prepared without utilizing the ACF-$CH_2$—Cl intermediate. First the acid treated ACF (ACF-OH) was prepared by reacting ACF with a 50/50 (v/v) mixture of nitric and sulfuric acids. The acid treated ACF was extensively washed with water until the solution reached to a neutral pH before drying in vacuo. The acid treated ACF was stored under nitrogen until use. Next, the ACF-SH was prepared using acid treated ACF which is rich in —OH groups. Specifically, the acid treated ACF was reacted with thiourea (1 eq.) and hydrobromic acid (1 eq.) in water at 100° C. for 16 hours under a nitrogen atmosphere. The reaction was cooled to medium to room temperature and sodium hydroxide (2 eq.) was added and then the medium refluxed for 16 hours at 100° C. under a nitrogen atmosphere. The modified ACF was extensively washed with water until the solution reached to a pH above 6.0 before drying in vacuo. The prepared ACF-SH (III) was stored under nitrogen until use.

Case Study #9: Measurement of Arsenic Adsorption by the Functionalized Carbon Fibers Adsorption tests were used to measure the interaction of the functionalized carbon fibers. At first, we performed the study with arsenate (As(V)) in the absence of competing ions to evaluate the adsorption kinetics and reproducibility of the preparation of fibers. Next, we perform the kinetic studies under the various pH to see whether functionalized ACF can catch arsenate under the changing pH. Next, the interaction of the functionalized ACFs with As(V) was measured in the presence of synthetic ground water to see the competitive effects of common anions and cations on the arsenic adsorption of selected functionalized ACF. As there was a large number of samples to be analyzed in the adsorption experiments and general analysis of fibers such as titration, elemental analysis, surface analysis, limited amounts of fiber and a simple shaking method were used instead of a flow through method, although it is known that adsorption/absorption capacities are much higher when the arsenic solution is flowed through a column or module packed with the ACF.

The adsorption of arsenic, As(V) by functionalized ACF was measured as follows. One hundred mg of each functionalized ACF (dry wt.) was placed in 20 mL of a test solution in an EDTA washed container at pH 7.0 (unless otherwise noted). The samples were shaken for a designated time period and the aliquots were removed for the determination of remaining arsenic. The adsorption (loading) was expressed as the mg of arsenic adsorbed divided by the mass of fabric used. The determined total arsenic concentration in all test solutions was made mainly by graphite furnace atomic absorption spectrometry (GFAA; EPA Method 200.9) in house and occasionally inductively coupled plasma mass spectroscopy (ICP-MS; EPA Method 200.8) for determination of As below 10 ppb.

Figure 11:
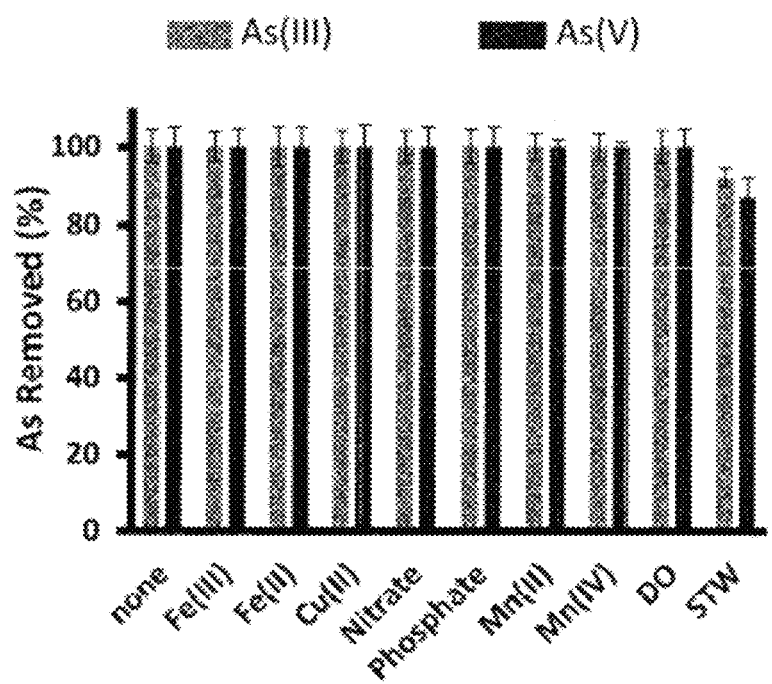
FIG. 11 shows effects of competitive ions on the adsorption of AS(III) and As(V) to ACF-SH (III) according to embodiments of the present disclosure.

Although there were some preliminary results in the adsorption kinetic studies using ACF-SH (II) with fixed concentration of arsenics, it was decided to use the same fabric amount (100 mg), with varying concentrations of arsenic (200 ppb instead of 1 ppm) for all the adsorption tests except isothermal binding experiments. Therefore, first the adsorption (binding) kinetic study using ACF-SH (II) to assess the approximate equilibrium time points of the adsorption, as shown in FIG. 11. The reaction medium containing 100 mg ACF-SH (II) and 200 ppb arsenic in 20 mL deionized water (adjusted to pH 7.0) was shaken at 180 rpm at 22° C. using an orbital shaker. After each time point, an aliquot was collected to measure the remaining arsenic by GFAA to determine the adsorbed amount of arsenic. Initial and final concentrations of the metalloids in the test solutions were measured by the analytical methods described above. Data were used to calculate the bed amount of As(V) to the functionalized ACF.

Figure 9:
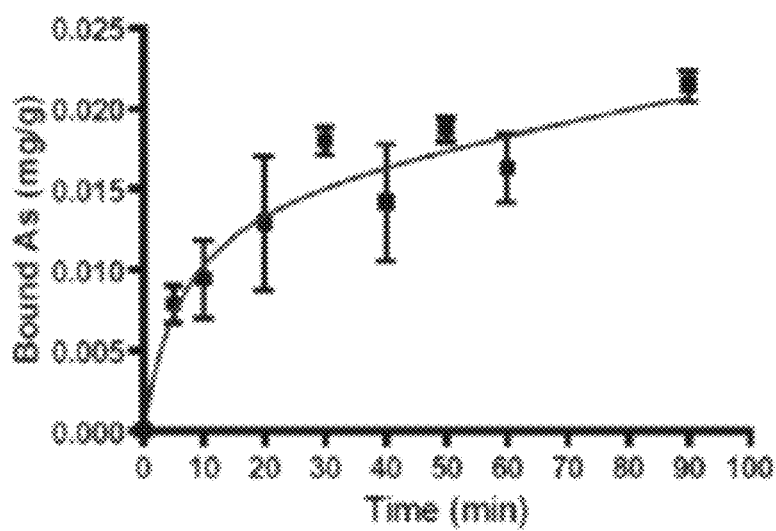
FIGS. 9 and 10 show example measurements of arsenic (As(V)) adsorption by the functionalized carbon fibers according to embodiments of the present disclosure.

As shown in FIG. 9, the arsenic adsorption by ACF-SH (II) apparently reaches the first phase of equilibrium after 40~60 minutes of incubation (most likely due to the binding of arsenics to the high affinity binding sites or external binding sites of ACF-SH (II)). After 40~60 minutes of incubation, the adsorption (absorption/binding) process still continued at a much slower rate for almost several hours. This is likely due to the arsenic binding to the internal binding sites inside the ACF matrix. In this case study, we focused on the first phase of the binding/adsorption process since we are focusing on the recovery of arsenic at point of entry (POE) and/or point of use (POU) devices, which require efficient removal of arsenic in a short contact time. Therefore, a shorter (60 minutes) incubation time was employed to evaluate the efficacies of each functionalized ACF.

The first extensive screening of the functionalized ACF was performed using various pH with a fixed relatively low concentration of arsenic (200 ppb) and a fixed amount (100 mg) of ACF in 20 mL of deionized water (DI water). Each reaction medium was shaken at 180 rpm using an orbital shaker. After one hour, an aliquot was collected to measure the remaining arsenic by GFAA to determine the adsorbed amount of arsenic. Initial and final concentrations of the metalloids in the test solutions were measured by the analytical methods described above. Data were used to calculate theadsorbed amount of As(V) to the functionalized ACF.

In the results all the functionalized ACF preparations showed much higher absorption (loading) capacity than that of native ACF for arsenic. In addition, ACF-NH—SH (I), ACF-SH (III) and ACF-NH—SH (II) indicated higher adsorption (loading) capacity of arsenic than that of ACF-SH (II) and ACF-OH. ACF-SBX had relatively high adsorption capacity at pH 6.0. However, the adsorption capacity of ACF-SBX decreased rapidly in the pH higher than 7.0.

Although ACF-SH (II) did not show higher adsorption capacity compared with ACF-NH—SH (I), ACF-SH (III) and ACF-NH—SH (III), the reproducibility of the preparation of ACF-SH (II) was one of the best among tested functionalized ACF. Therefore, we included this for the remainder of the study. On the other hand, the reproducibility of the preparation of ACF-SH (I) was the lowest among all the preparations. The preparation also did not have significant adsorption capacity of arsenic. It, along with ACF-Ph-SH and ACF-OH, ACF-SH (I) were excluded from further studies of arsenic adsorption properties.

Figure 10:
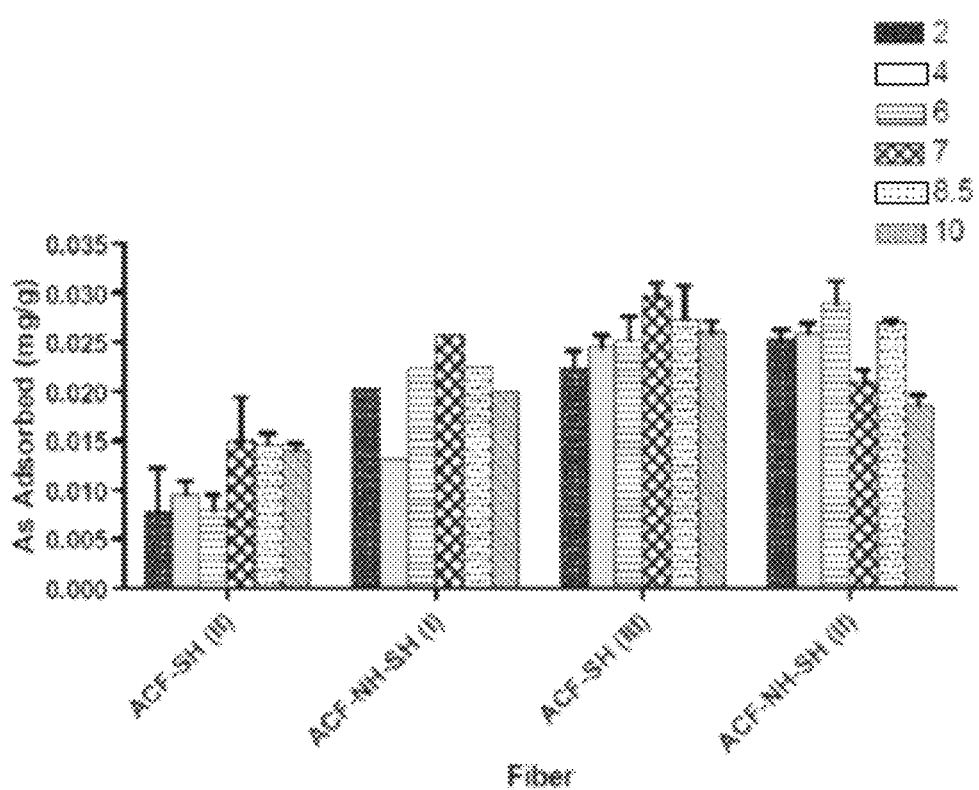

Next, review of the pH dependence of arsenic adsorption to selected functionalized ACF (ACF-NH—SH (I), ACF-SH (III), ACF-NH—SH (III), and ACF-SH (II)) was studied in detail between pH 2.0 and pH 10.0. FIG. 10 shows the results.

Although ACF-NH—SH (I) showed reasonable adsorption capacity for arsenic, it was not easily reproduced, and was difficult to obtain consistent arsenic adsorption profiles. ACF-SH (III) and ACF-NH—SH (II) were both promising as excellent arsenic adsorbents under the wide range of pH. Therefore, through pH dependence studies of arsenic adsorption to functionalized ACF, we determined that the best functionalized ACFs for further studies were ACF-SH (III) and ACF-NH—SH (II). However, ACF-SH (II) was used in many of the studies as it is easily and economically prepared while still showing reasonable arsenic adsorption capability. In addition, the improvement of the synthetic route of ACF-SH (II) to increase the adsorption capacity could be feasible.

The elemental analyses of selected functionalized ACFs were performed to determine elemental composition at normal resolution for each sample, illustrated in Table 2 below. The fabric samples showed that different degrees of sulfur, oxygen, and nitrogen atom contents that are consistent with methods of the treatments of ACF. The method employed in the preparation of ACF-SH (III) was the most efficient method for increasing the total sulfur content in the fabric.

TABLE 2

Elemental Composition of Fabric Samples

| Sample | Atomic Percent | | | | |
|---|---|---|---|---|---|
| | C | H | N | S | O |
| ACF | 82.9 | 1.6 | 2.4 | nd | 9.3 |
| ACF-SH (I) | 73.1 | 1.7 | 2.8 | 7.2 | 11.0 |
| ACF-SH (II) | 69.1 | 2.1 | 3.0 | 1.6 | 19.6 |
| ACF-NH-SH (I) | 71.6 | 2.4 | 3.7 | 2.6 | 10.0 |
| ACF-OH | 55.9 | 2.3 | 2.8 | 0.6 | 16.6 |
| ACF-SH (III) | 51.8 | 1.6 | 4.9 | 18.1 | 6.8 |

The next isothermal binding studies were performed using the following three functionalized ACF: ACF-SH (III), ACF-NH—SH (II), and ACF-SH (H). The isothermal binding (adsorption) curve was complicated for ACF-NH—SH (II), having multiple adsorption phases and a lack of consistency (data not shown). The adsorption of arsenic to both ACF-SH (HI) and ACF-SH (II) showed good isothermal curves. In review, the arsenic binding to ACF-SH (III) was far higher than arsenic binding to ACF-SH (Th. Therefore, we focused on ACF-SH (III) to characterize its arsenic removal capacity.

Next, the adsorption experiments was performed using a standard synthetic test water (STW) solution (Table 3), containing most of the common ions found in drinking/ groundwater. Briefly, the functionalized ACF (ACF-SH (III)) was placed in test bottles containing either STW solution or DI water which were subject to shaking (200 rpm) in a temperature-controlled water bath. After one hour, an aliquot was collected to measure the remaining arsenic by GFAA. It is encouraging that ACF-SH (III) maintained at least 70% (at >1 ppm arsenic) and 85% (at below 0.5 ppm) of its arsenic binding (adsorption) capacity in SWT.

TABLE 3

Composition of the Standard Synthetic Test Water (STW) Solution

| Cations | meq/L | mg/L | Anions | meq/L | mg/L |
|---|---|---|---|---|---|
| $Na^+$ | 3.3 | 75.9 | $HCO_3^-$ | 3.0 | 183.0 |
| $Ca^{2+}$ | 2.0 | 40.2 | $SO_4^{2-}$ | 0.5 | 24.0 |
| $Mg^{2+}$ | 1.0 | 12.2 | $Cl^-$ | 2.5 | 88.8 |
|  |  |  | $SiO_2$ | 0.3 | 20.0 |
| Total | 6.3 | 128.3 | Total | 6.3 | 315.8 |

Case study #11: Evaluation of functionalized ACF for removal of bound arsenic Selected fibers were evaluated, especially, ACF-SH (III) and ACF-NH—SH (II), and to some extent, ACF-SH (II) for the development of modules composed of arsenic-selective ligand-anchored ACF.

The first criterion for the evaluation is the optimal combination of adsorption capacity and regeneration efficiency. Those functionalized ACF, especially ACF-SH (III), show distinct notability in terms of adsorption capacity of arsenic over a wide range of pH and easily reproduced preparation through simple synthetic routes. The ACF-SH (III) was superior to any other functionalized ACF tested here in arsenic adsorption capacity in the presence of Standard Test Water (STW). In terms of regeneration, it was found that adsorbed (absorbed) arsenic bound to the ACF-SH (III) matrix and was not easily dissociated. Regeneration of other functionalized ACF including ACF-SH (I) was accomplished by changing the ionic concentration or the pH of the system.

Options to regenerate ACF-SH (III) by means of changing the ionic strength of the system and exposure to the arsenic-ACF-SH (III) complex to the low and high pH using 1-10 bed volumes of regeneration solution are considered. Neither trial proved an effective method of dissociating bound arsenics from ACF-SH (III). The above mentioned phenomenon is reasonable because ACF-SH (III) shows high arsenic adsorption capacity in wide range of pH and in the presence of salt solution.

The extremely tight binding of arsenic to ACF-SH (III) is not negative to the intended use. However, consideration is made to methods of disposing the recovered arsenic as a stabilized complex with ACF-SH (III). This ACF is light weight and easily forms complexes with stabilizing compounds to mask the ACF-SH (III) matrix.

A major factor in regulating the total cost of any remediation technology is the reusability of the adsorbent through regeneration, and the cost of regeneration of the adsorbent. In sonic cases, the cost of regeneration far outweighs the cost of replacement and produces the vast amount of solvent contaminated with arsenic. Therefore, if a simple and cost effective regeneration technique is not readily available, disposal of recovered arsenic as a stable complex is another option in drinking water remediation.

The reproducibility in preparing the fibers was the second important evaluation criteria for this functionalized ACF-based arsenic removal technology. In sonic systems, it was found ACF-SH (III) was superior to all the other functionalized ACF tested in terms of high binding capacity in the wide range of pH and in the STW, reproducibility in the preparation and adsorption assays. As such, in one example, ACF-SH (III) may remove greater than 95% Arsenic (V) from test solutions containing 0.05-1.0 mg/L Arsenic (V), and a maximal loading capacity (estimated by isothermal studies) of 5~30 mg of Arsenic (V) per gram of functionalized ACF when incorporated into the tightly packed module. However, the operational capacity which does not release or remain more than 10 ppb arsenic will be much less and estimated to be around 100 µg/g. The operational loading capacities of ACF-PO4, ACF-SO4, ACF-OH and ACF-SH for removing lead, mercury, cupper (II), iron (II), platinum, nickel and palladium are generally much higher to be around 20~80 mg/g fiber.

Next, competitive adsorption studies were performed using both As(V) and As(III). The adsorption of As(III) in the absence of STW is very similar to that of As(V). ACF-SH (III) maintained at least 85~92% of its binding (adsorption) capacity for As(III) in SWT, which is somewhat better than that of As(V) (70~85%). As(III) bound very tightly to ACF-SH (III) over a wide range of pH (2-10), which is similar to the case of As(V) binding to ACF-SH (III) (data not shown). It has been determined that 2 hours treatment times with 100 ppb for both arsenic species will provide comparable binding data (data not shown). There were no significant effects of tested well known competitive ions (Fe(II), Fe(III), Cu(II), Mn(II), Mn(IV), nitrate and phosphate) at five times mass equivalent of As(V) and As(III) on the adsorption of both arsenic species to ACF-SH (III), under the experimental conditions employed here. Also, >20 ppm oxygen had no effect on either As(V) or As(III) adsorption onto ACF-SH (III). As expected from the previous studies, STW inhibited the binding of both As(V) and As(III) to ACF-SH (III) at 8% and 13%, respectively. The adsorption capacity of ACF-SH (III) for As(III) and As(V) in the presence of increasing concentrations of Fe(III) (up to a 50-fold equivalent of As(V) and As(III)) were studied. At 50-fold mass equivalents, Fe(III) did not have any significant effect on the removal of As(V) or As(III) by ACF-SH (III), Data not shown Referring back to FIG. 5, the surface-modified fiber may be capable of binding arsenic. FIG. 5 schematically shows arsenic binding to a surface-modified fiber, specifically to a sulfur-treated activated fiber 60. As shown, the sulfur-treated activated fiber 60 may include macropores, micropores, and/or nanopores. An enlargement of such a pore is indicated generally at 62. Pore 62 may include selective functional groups 'X,' 'Y,' and 'Z.' For example, a selective functional group X (such as an-arsenic selective group) may be a sulfur-containing functional group such as SH, although additional and/or alternative functional groups are possible without departing from the scope of this disclosure. For example, one or more functional groups such as Y and Z may be a carboxyl group, a hydroxyl group, an ester, a carbonyl group, and/or a nitrogen-containing functional group.

FIG. 5 also shows various molecular interactions that may occur between the surface-modified fabric and As(III) and As(V. Further, FIG. 5 shows various molecular interactions that may occur between the surface-modified fabric and As(III) and As(V. It will be appreciated that bond formations other than those shown in FIG. 5 may occur without departing from the scope of this disclosure.

The following in regards to FIG. 5 is provided as an illustration of an optional construction and not as a limitation. Specifically, as discussed, in some embodiments, an ion-barrier further may be constructed on the surface of the fibers. Any suitable ion-barrier may be constructed, for example, and not as a limitation, an ion barrier may be prepared by attachment of a long chain hydrocarbon moiety onto the surface of the fiber. For example, a hydrocarbon moiety may be used, including a lipid or fatty acid which may be attached onto the surface of the fiber. The attached lipid barrier, such as a lipid chain, ring, etc. may create a physical barrier to the internal surface of the fabric. Any suitable fatty-acid chain or the like may be used for attachment onto the fiber. The ion-selective barrier also could be created by attachment or overlay of a semi-permeable membrane made of hydrophobic materials.

The ion-selective barrier may include fatty acid chain extensions with carbon chains of C4-C25. The carbon chains may extend away from the body of the fabric to form a physical barrier to cations, such as K+, Na+, Mg2+, and Ca2+. It should be noted that such cations may be of an increased size due to hydration. Thus, although the fiber may be charged such that various ions are attracted to the fiber, some large molecules (such as the highly hydrated cations) may be prohibited from entering into the fiber by the fatty acid chain extensions. Thus, the chains may operate as an ion-selective barrier, allowing small molecules to pass through into the fiber, (thus trapping the less hydrated molecules within the fiber), while physically preventing the larger molecules (such as the hydrated cations) from passing through to the trap.

The hydrophobic nature of the ion-selective barrier must be balanced with the accessibility of aresenic to the selective functional groups that bind arsenic. Thus, the barrier must be sufficiently hydrophobic to repel the substantial cations (minerals), but be not so hydrophobic as to significantly decrease the rate of diffusion of As(V) which is negatively charged as well as relatively hydrophilic organic toxins. Most of organic toxins are less hydrophilic or rather hydrophobic as shown by the log p values in Table 1. Therefore, those organic toxins will be well adsorbed by ACFs and even some organic toxins with extended carbon chains (which are generally difficult to be removed) could be trapped by the ion-selective barrier.

For example, essential minerals, such as K+, Na+, Mg2+, and Ca2+may be substantially unable to penetrate the physical barrier presented by the carbon chains. The essential cations may be considered to be repelled from the ion selective hydrophobic barrier. Thus, the essential cations are retained in the treated water, thereby maintaining ionic homeostasis and mineral balance which are important for body health and bone remodeling as well as taste in the water.

However, toxins may be able to penetrate the barrier and thus may be readily adsorbed by the fiber. The toxins become trapped within the barrier. The chains may also be configured to allow arsenic or other toxins to pass through and be trapped by the barrier. It should be appreciated that in some embodiments the carbon chains may be of different sizes along the length of the fiber or the fabric. In other embodiments, the carbon chains may be of the same length along the fiber or fabric. The position of the chains may be dependent on the effectiveness of the barrier. Moreover, in some embodiments, where shorter length chains are utilized, the shorter length chains may be positioned in relatively close proximity, while, in other embodiments, longer length chains may be more separated. Such spacing may be effective as the longer chains may cover more area and provide an appropriate physical barrier without being as closely positioned as shorter length chains. Further, although shown as extended carbon chains, in some embodiments, the chains may include one or more rings, or other configurations, such that the carbon chains are considered a carbon barrier. It should be noted that the addition of the ion-selective barrier to this water purification system will be optional and depends upon the needs of people and quality of drinking water.

Although other suitable ion barriers may be prepared on the fiber, the following method of constructing an ion barrier on the activated fiber is provided for illustrative purposes. Specifically, in one embodiment, a surface-modified activated fiber, such as an acid-treated activated fiber, may be further modified to create an ion barrier by addition of a fatty acid. The fatty acid may be as short as C4 or may extend to C25. In some embodiments, fatty acids with chain lengths of C14 to C17 may be used. It is noted that the carbon of the carboxyl group of the fatty acid is counted when discussing the number of carbons in the fatty acids. In other examples, the ion barrier may not be employed.

In an exemplary embodiment, an ion-barrier may be constructed on the activated fiber by reacting a surface-treated activated fiber, such as an acid-treated activated fiber, with palmitoyl chloride in the presence of an acid scavenger, such as pyridine, triethylamine, 4-(dimethylamino)pyridine, Proton-Sponge®, and several polystyrene-divinylbenzene (PSDVB)-supported acid scavengers including several PSDVB-supported piperidine compounds. The reaction may result in addition of palmitoyl groups (C16) attached to the activated fiber. It should be appreciated that any other suitable carbon chain or carbon barrier may be attached to the activated fiber, in addition to, and/or alternatively to, the palmitoyl groups.

Further the fibers may be modified to include both an ion barrier and immobilized enzyme or microbial biofilm. The immobilized enzyme may be configured to decompose arsenic into smaller molecular ions. The ions may be trapped by the fabric. For example, positively-charged ions may be attracted to a negatively-charged fabric. As another example, negatively-charged ions may be attracted to a positively-charged fabric. It will be appreciated that the fabric may be negatively-charged or positively-charged. As another example, the fabric may include negatively-charged zones and positively-charged zones for attracting positively-charged ions and negatively-charged ions respectively.

Any suitable method may be used to immobilize the selected enzyme. In some embodiments, it may be selected to covalently attach arsenate reductase, or other suitable enzyme, to the fiber. Any suitable biochemical methods may be used to attach or otherwise immobilize the select enzyme or enzymes. For example, coupling agents, and/or covalent linkers, as well as other biochemical methods, may be used to immobilize arsenate reductase, or an alternative ion-selective compound, onto the fiber.

As described above, in one exemplary embodiment, the synthesized selective adsorbent fabric may include one or more fibers with one or more of the following: a hydrophobic layer adjacent to attached lipid chains, an ion-selective barrier formed by the lipid chains, immobilized arsenic reductase capable of catalyzing the hydrolysis of arsenate to arsenite ions, for example, and other chemical reaction intermediaries, and hydrophilic pores capable of trapping other toxins and/or ions from the hydrolysis of arsenic.

Figure 12:
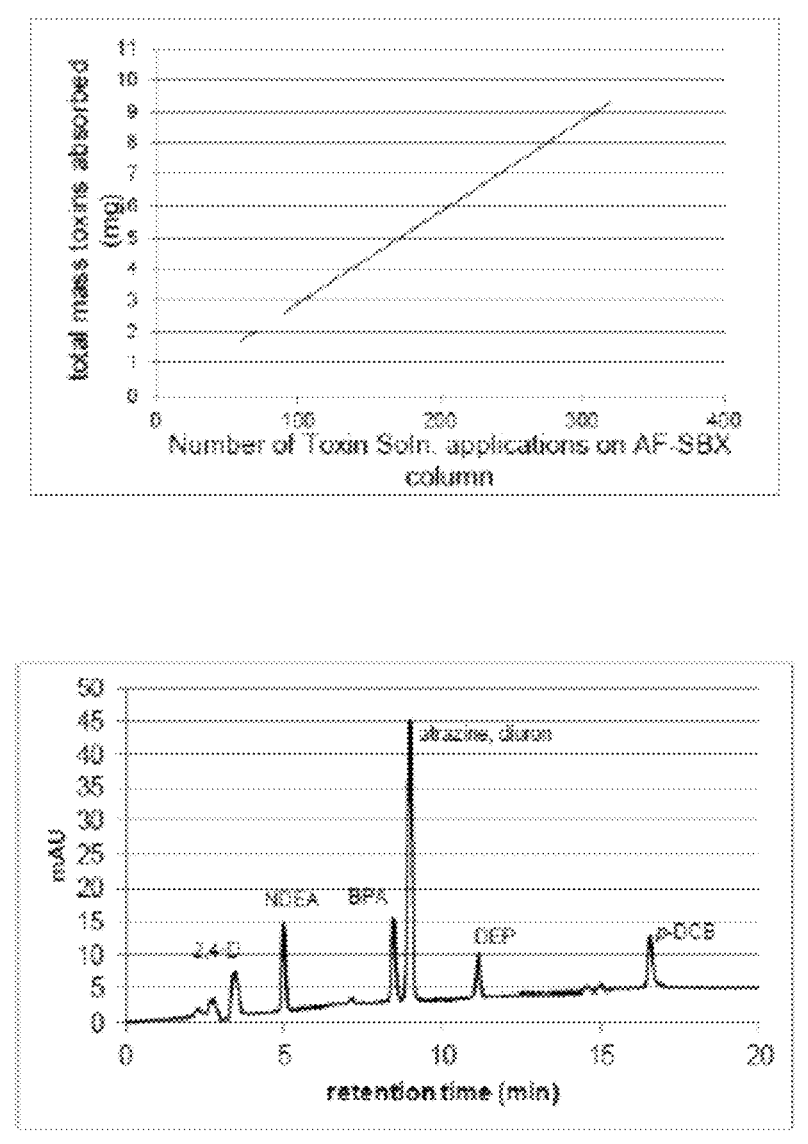

Turning to FIG. 12, it shows repetitive application of toxic chemical solution on the column packed with 100 mg ACF-SBX. Loading capacity of organic chemicals by ACF-SBX was determined as follow:

A solution (2.0 ml) containing 2 ppm each of atrazine, p-dichlorobenzene (p-DCB), diuron, 2,4-dichlorophenoxyacetic acid (2,4 D), N-nitrosodiethylamine (NDEA), bisphenol A (BPA), and diethyl phthalate (DEP) in pH 6.9 STW was applied each time. The applications were repeated at least 300 times without any elution of above chemicals except NDEA (after 200 times) which is known concerned toxic chemicals difficult to remove from drinking water. Since HPLC profile on the eluted through ACF-SBX was just flat. The eluted fraction (at 200 times) was subjected to more sensitive LC/MS after SPE extraction—concentration of eluted solution. There were some background peaks (very minimal) were observed, but, no chemicals equivalent to the masses of applied seven chemicals was found. Therefore, it is very likely that all the chemicals repeatedly applied were adsorbed and also no leaching out FIG. 12 shows the experimental results.

From the above experimental results, the maximal operational capacity (95% to 100%) of 7 toxins was assessed by repeatedly applying the chemicals (about 2.0 ppm each). The resulting toxin concentration of 14 ppm total toxins is about 100~200 times higher than the total toxic organic chemical concentration at most sites of ground/drinking water contamination (other than industrial waste water sites). The results indicate that if there is no strong competitive materials in ground/well water, an ACF-SBX module containing 100 grams of ACF will filter up to 5-10 grams (5-10% of fiber weight) without leaching. Assuming a total organic contamination of 500 ppb (one of the highest cases in the drinking water/well water), 14 liters of drinking water per day (standard for a four-member family), the filter would need to clear 7 mg/day and 2.56 grams organic toxins/year. Therefore, unless extreme environments exist, such as very high concentrations of organic toxins or natural organic matter (NOM), residents will not have to change the filter for at least a year. Thus, the combination of ACF-SBX and ACF-SH (III) will create the powerful tool for water purification contaminated with both arsenic, toxic metals, and toxic organic chemicals.

Thus, the systems described above provide for a system capable of removing toxins from water for water purification. In an embodiment, the system comprises a purification chamber comprising a selective adsorbent activated carbon fiber fabric including one or more selective functional groups that bind arsenic.

The fabric may be disposed to create a water flow channel in the purification chamber. In one example, the fabric is in a spiral configuration. In another example, the fabric is in a flat layered configuration. The system may further comprising a pump to move water along the flow channel. The one or more selective functional groups may be included on a surface of the activated carbon fiber. The one or more selective functional groups may include one or more of a sulfur-containing group, a hydroxyl, a carboxylic acid, a carbonyl, an ester, a nitrogen-containing group, and strongly-basic anion-exchange group. In an example, the selective adsorbent fabric includes a bound arsenic reductase enzyme.

The system may further comprise one or more functional groups to adsorb toxic metals or toxic organic chemicals, where the toxic metals comprise one or more of lead, mercury, cadmium, chromium, nickel, iron copper, platinum, and palladium. The functional groups to adsorb toxic metals or toxic organic chemicals may be included within or on a surface of the activated carbon fiber.

The purification chamber may include an ion-selective barrier, for example coupled to the activated carbon fibers.

The system may be portable, or the system may be stationary, for example for use in treating a municipal water source. The system may include an inlet from one of well or ground water.

In an embodiment, a water purification system comprises an inlet to admit untreated water; a purification chamber comprising a selective adsorbent activated carbon fiber fabric having a surface including one or more selective groups that bind arsenic; and an outlet to discharge treated water.

The one or more selective groups that bind arsenic may comprise one or more of a thiol selective group and a strongly basic anion exchange group. The fabric may be disposed in the purification chamber to create a water flow channel fluidically coupling the inlet to the outlet. In an example, the fabric is disposed in a spiral configuration.

Figure 13:
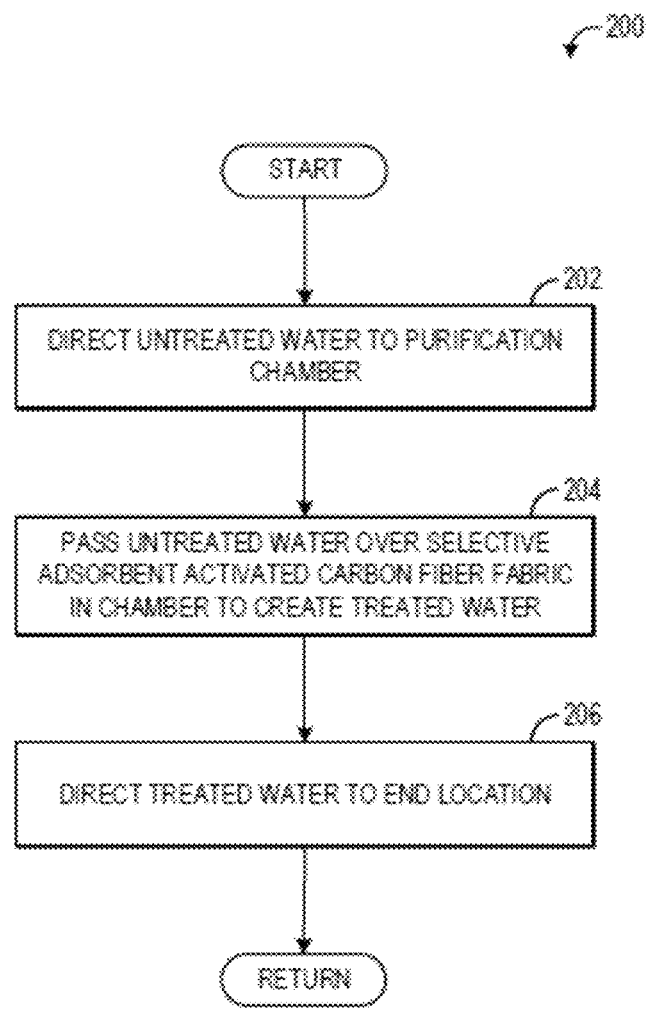
FIG. 13 is a flow chart illustrating a method for purifying water.

Turning now to FIG. 13, a method 200 for purifying water is illustrated. The water purification method illustrated in FIG. 13 may be carried out using a water purification system as described in one of the examples above. At 202, method 200 includes directing untreated water to a purification chamber. The untreated water may be directed from a suitable source, such as ground water, well water, etc. The untreated water may include various toxins, including but not limited to arsenic. The untreated water may be temporarily housed in a reservoir, e.g., an untreated reservoir, before being directed to the purification chamber. The reservoir may be separate from or integrated with the purification chamber. Further, the untreated water may be directed to the purification chamber via a pump, gravity flow, capillary action, or other mechanism.

The purification chamber may be a suitable chamber housing a selective adsorbent fabric adapted to trap arsenic and/or other toxins, such as the purification chamber described above with respect to FIGS. 1A-1C and FIG. 2. The selective adsorbent fabric may include activated carbon fibers having selective functional groups on its surface which bind arsenic. The selective functional group or groups may include sulfur-containing groups, strongly basic anion exchange group, or other arsenic-binding groups. Further, the fabric may alternatively or additionally include bound arsenic reducatse, to enzymatically break down the arsenic, and/or an ion barrier. When the untreated water is directed to the purification chamber, the untreated water passes over the selective adsorbent activated carbon fiber fabric, where arsenic and/or other toxins are bound, trapped, or otherwise retained by the fabric. Further, in some embodiments, desired cations or other molecules in the untreated water may not be trapped by the fabric and thus are retained in the water.

Thus, as indicated at 204, after the untreated water is directed to the purification chamber, it is passed over the selective adsorbent activated carbon fiber fabric in the chamber to create treated water. The treated water is then directed to an end location at 206. The end location may be a treated water reservoir separate from or integrated with the purification chamber. In other examples, the end location may be a facet, municipal water tank, storage or drinking vessel, or other suitable location.

Thus, in an example, method 200 described above provides for a method for purifying water, comprising directing untreated water to a purification chamber; and passing the untreated water over a selective adsorbent activated carbon fiber fabric in the purification chamber to create treated water, the fabric including one or more selective functional groups that bind arsenic.

Directing untreated water to the purification chamber may include directing well or ground water to the purification chamber via a pump. In an example, passing the untreated water over the selective adsorbent activated carbon fiber fabric may include passing the untreated water over a selective adsorbent activated carbon fiber fabric including a sulfur-containing group. In an example, passing the untreated water over the selective adsorbent activated carbon fiber fabric may include passing the untreated water over a selective adsorbent activated carbon fiber fabric including a bound arsenic reductase enzyme.

It should be appreciated that although the purification chamber and associated fabric is described for use in a water treatment system, the purification chamber and associated fabric may be used in any purification system. As such, the purification chamber and associated fabric may be used in other systems that require removal of toxins from a fluid. For example, the purification chamber may be used to remove toxins from fish hatcheries, and other aquaculture based industries.

Further, it will be appreciated that the above toxin trap may be used to trap other types of toxins, including pathogens, viruses, bacteria, etc. In these systems, the traps may include an alternative adsorbent, specific to trap the select toxin. For example, such a system may be applied to reduce or minimize the presence of toxins, including pathogens, viruses, bacteria, etc. that may contaminate waterways and contribute to waterborne diseases.

Although the present disclosure includes specific embodiments, specific embodiments are not to be considered in a limiting sense, because numerous variations are possible. The subject matter of the present disclosure includes all novel and nonobvious combinations and sub-combinations of the various elements, features, functions, and/or properties disclosed herein. The following claims particularly point out certain combinations and sub-combinations regarded as novel and nonobvious. These claims may refer to "an" element or "a first" element or the equivalent thereof. Such claims should be understood to include incorporation of one or more such elements, neither requiring, nor excluding two or more such elements. Other combinations and sub-combinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. An activated carbon fiber comprising one or more functional groups comprising
one or more of

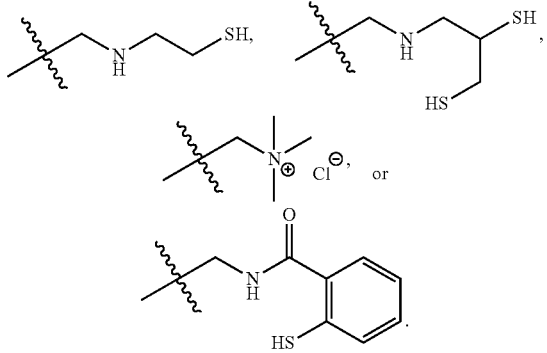

2. The activated carbon fiber of claim 1, wherein the fiber further comprises one or more of a hydroxyl, a carboxylic acid, a carbonyl, an ester, a nitrogen-containing group,

or a strongly-basic anion-exchange group.

3. A system capable of removing toxins from water for water purification, the system comprising a purification chamber comprising an activated carbon fiber fabric comprising the activated carbon fiber of claim 1.

4. The system of claim 3, wherein the fabric further comprise one or more of a hydroxyl, a carboxylic acid, a carbonyl, an ester, a nitrogen-containing group,

or a strongly-basic anion-exchange group.

5. The system of claim 3, wherein the fabric is associated with the purification chamber to provide a water flow channel.

6. The system of claim 5, wherein the fabric is in a spiral configuration or a flat layered configuration.

7. The system of claim 5, further comprising:
a pump to move water along the water flow channel;
an inlet from a well or ground water source; or
a combination thereof.

8. The system of claim 5, wherein the one or more functional groups are included on a surface of the activated carbon fiber fabric.

9. The system of claim 3, wherein the fabric further comprises one or more functional groups to adsorb toxic metals or toxic organic chemicals, where the toxic metals comprise one or more of lead, mercury, cadmium, chromium, nickel, iron, copper, platinum, and palladium.

10. The system of claim 3, wherein the purification chamber includes an ion-selective barrier.

11. The system of claim 3, wherein the system is portable.

12. An activated carbon fiber comprising one or more functional groups comprising

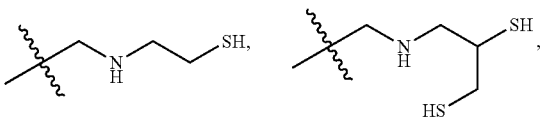 [SMILES: *CNCCS ; *CNCC(S)CS]

or a combination thereof.

13. A system capable of removing toxins from water for water purification, the system comprising a purification chamber comprising an activated carbon fiber fabric comprising the activated carbon fiber of claim 12.

14. A method for purifying water, comprising:
directing an untreated water stream to a purification chamber to create a treated water stream, the purification chamber comprising an activated carbon fiber fabric that binds a contaminant in the untreated water stream, the fabric comprising one or more functional groups selected from

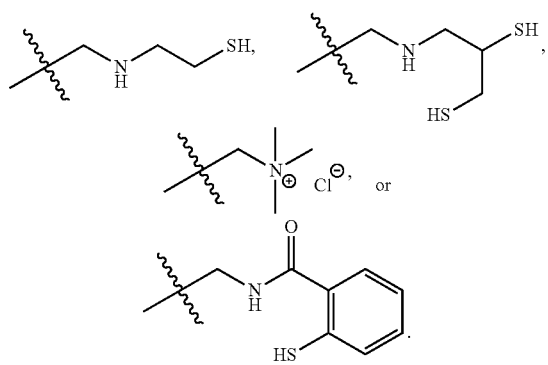

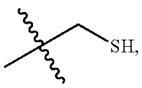 [SMILES: *CS]

and a strongly-basic anion-exchange group.

16. The method of claim 14, wherein directing the untreated water stream to the purification chamber comprises directing well or ground water to the purification chamber via a pump, gravity flow, or a combination thereof.

17. The method of claim 14, wherein the contaminant comprises arsenic, lead, mercury, cadmium, chromium, nickel, iron, copper, platinum, palladium, or a combination thereof.

18. The method of claim 14, wherein the contaminant comprises arsenic (III), arsenic (V), or a combination thereof.

19. A water purification system, comprising:
an inlet to admit untreated water;
a purification chamber comprising an activated carbon fiber fabric that binds arsenic(III) and arsenic(V) species, the fabric having a surface comprising one or more groups located on the surface, the groups comprising one or more of

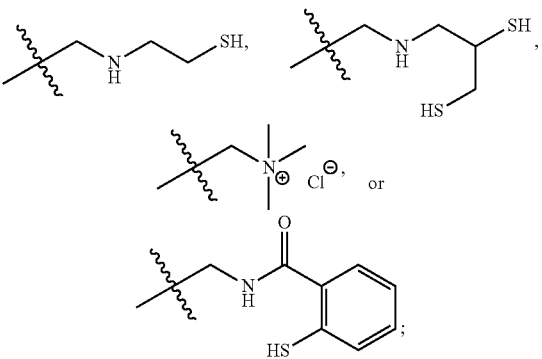

and
an outlet to discharge treated water.

20. The system of claim 19, wherein the activated carbon fiber fabric further comprises one or more of a hydroxyl, a carboxylic acid, a carbonyl, an ester, a nitrogen-containing group,

and a strongly-basic anion-exchange group.

21. The system of claim 19, wherein the fabric is disposed in the purification chamber to create a water flow channel fluidically coupling the inlet to the outlet.

22. The system of claim 19, wherein the fabric is disposed in a spiral configuration.

* * * * *

UNITED STATES PATENT AND TRADEMARK OFFICE
CERTIFICATE OF CORRECTION

| | | |
|---|---|---|
| PATENT NO. | : 10,106,436 B2 | Page 1 of 1 |
| APPLICATION NO. | : 15/669577 | |
| DATED | : October 23, 2018 | |
| INVENTOR(S) | : Takuji Tsukamoto et al. | |

It is certified that error appears in the above-identified patent and that said Letters Patent is hereby corrected as shown below:

In the Specification

Column 1, Line 12 (approx.), before the heading "TECHNICAL FIELD", please insert the following paragraph:

--GOVERNMENT LICENSE RIGHTS
This invention was made with government support under NIEHS SBIR Phase I Grant No. 1R43ES015422-01 awarded by the National Institutes of Health. The government has certain rights in the invention.--

Signed and Sealed this
Eleventh Day of December, 2018

Andrei Iancu
*Director of the United States Patent and Trademark Office*